(12) United States Patent
Ellis

(10) Patent No.: US 8,877,046 B2
(45) Date of Patent: Nov. 4, 2014

(54) SYSTEM FOR ADVANCED WASH WATER RECYCLING

(75) Inventor: Walter B. Ellis, Jupiter, FL (US)

(73) Assignee: RGF Environmental Group, Inc., Riviera Beach, FL (US)

( * ) Notice: Subject to any disclaimer, the term of this patent is extended or adjusted under 35 U.S.C. 154(b) by 660 days.

(21) Appl. No.: 13/186,854

(22) Filed: Jul. 20, 2011

(65) Prior Publication Data

US 2013/0020258 A1    Jan. 24, 2013

(51) Int. Cl.
| | | |
|---|---|---|
| C02F 3/00 | (2006.01) | |
| C02F 9/00 | (2006.01) | |
| C02F 1/40 | (2006.01) | |
| C02F 1/78 | (2006.01) | |
| C02F 7/00 | (2006.01) | |
| C02F 3/08 | (2006.01) | |
| C02F 101/32 | (2006.01) | |
| C02F 3/10 | (2006.01) | |
| C02F 11/12 | (2006.01) | |
| C02F 1/32 | (2006.01) | |
| C02F 1/00 | (2006.01) | |
| C02F 103/44 | (2006.01) | |

(52) U.S. Cl.
CPC ... C02F 9/00 (2013.01); C02F 1/40 (2013.01); C02F 1/78 (2013.01); C02F 7/00 (2013.01); C02F 3/085 (2013.01); C02F 2101/32 (2013.01); C02F 2201/3223 (2013.01); C02F 3/107 (2013.01); C02F 11/121 (2013.01); C02F 2201/008 (2013.01); C02F 1/325 (2013.01); C02F 2301/046 (2013.01); C02F 2001/007 (2013.01); C02F 2103/44 (2013.01)

USPC ........ 210/151; 210/195.1; 210/196; 210/220; 210/760

(58) Field of Classification Search
USPC ....................... 210/151, 195.1, 196, 220, 760
See application file for complete search history.

(56) References Cited

U.S. PATENT DOCUMENTS

| | | | | |
|---|---|---|---|---|
| 1,193,143 | A * | 8/1916 | Henri | 250/437 |
| 3,628,445 | A * | 12/1971 | Weber | 99/277.1 |
| 5,885,459 | A * | 3/1999 | Lerche et al. | 210/602 |
| 6,021,792 | A | 2/2000 | Petter et al. | |
| 6,303,025 | B1 | 10/2001 | Houchens | |
| 6,461,509 | B1 * | 10/2002 | Verwater et al. | 210/606 |
| 6,481,448 | B2 | 11/2002 | Mathieu | |
| 6,773,608 | B1 * | 8/2004 | Hallett et al. | 210/748.11 |
| 8,388,850 | B2 * | 3/2013 | Delano | 210/748.01 |
| 2002/0179514 | A1 * | 12/2002 | Anderson et al. | 210/258 |
| 2003/0200992 | A1 | 10/2003 | Goldman | |

* cited by examiner

*Primary Examiner* — Chester Barry
(74) *Attorney, Agent, or Firm* — Rothwell, Figg, Ernst & Manbeck, P.C.

(57) ABSTRACT

The present invention includes a system for recycling wash water, having a first separator configured to separate solids from wash water, a second separator configured to separate oil from wash water, a bioreactor configured to bacterially consume solids from wash water, a third separator configured to further separate solids from wash water, an oxidation chamber configured to sterilize and oxygenate wash water, an aeration tray configured to further oxygenate wash water, a storage tank configured to store wash water, and a pump configured to pump wash water from the storage tank to the bioreactor. The present invention also includes a process and method associated with the use and function of the system.

20 Claims, 29 Drawing Sheets

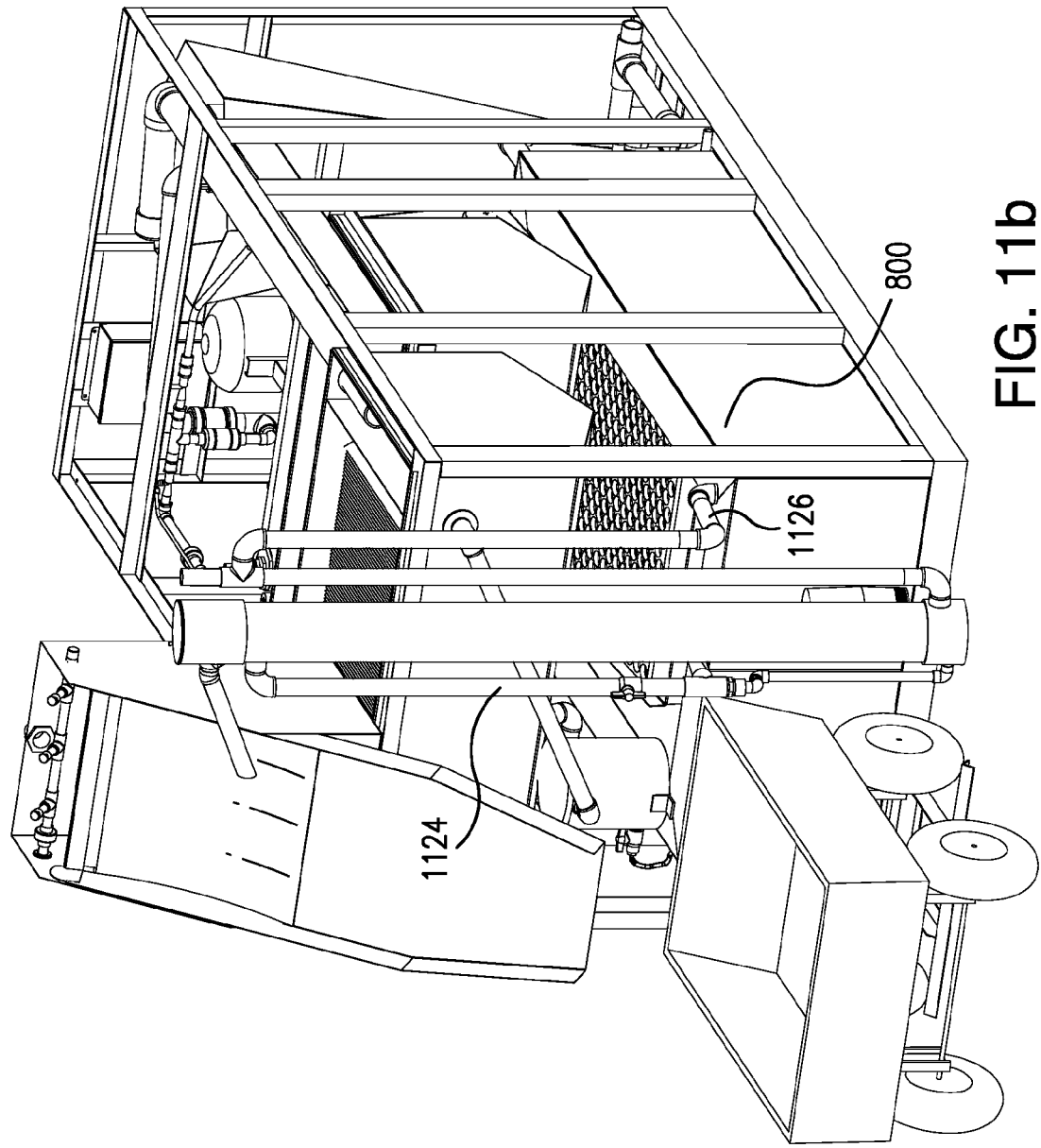

SYSTEM FOR ADVANCED WASH WATER RECYCLING

FIELD OF THE INVENTION

The present invention relates to a system and method for recycling of wash water through removal of solids, advanced bio-reaction, oxygenation and filtration.

BACKGROUND OF THE INVENTION

Motorized equipment, such as landscaping equipment, golf carts, tractors and sanitation equipment, are used on golf courses, farms, universities, government facilities, sod farms, resorts, camp grounds, waste management plants and other locations. Grass, oil, dirt and other solids accumulate on the equipment over time, and there is a constant need to wash the equipment for maintenance of the equipment. However, numerous environmental issues arise if precautions are not taken when washing the equipment. For example, fresh water is not properly conserved if it is simply pumped from a water source, used to wash solids off of the equipment, and not recycled. Of course, serious environmental problems arise if the oils and other hydrocarbons present on the equipment are washed off and dumped into the environment. Filtering, storing and recycling wash water for re-use, and removing hydrocarbons and other solids from wash water, has numerous benefits, including water and environmental preservation and conservation. Systems and methods designed to perform such filtering, storing and recycling can provide energy efficient and cost effective solutions to the above-recognized problems.

What is desired, therefore, is wash water recycling through the use of a combination of advanced bio-reaction, oxygenation and filtration systems and methods. What is also desired is a system that consumes solids through the use of bacteria, preferably naturally occurring bacteria. What is also desired is a system that maximizes the oxygen content in the wash water to assist with the bacterial consumption process. What is also desired is a system that is self-contained, portable, and energy efficient, and utilizes such things as gravity and pressure differential created by fluid flow to minimize the amount of energy expended.

SUMMARY OF THE INVENTION

Particular embodiments of the present invention provide systems and methods for recycling of wash water. In one aspect, a particular system for recycling wash water is provided. A first separator is configured to receive wash water and separate solids from the wash water. A second separator is configured to receive the wash water from the first separator and separate oil from the wash water. A bioreactor is configured to receive the wash water from the second separator, and the bioreactor contains bacteria to consume solids from the wash water. An oxidation chamber is configured to receive the wash water from the bioreactor. The oxidation chamber has an ultra-violet lamp configured to emit ultra-violet radiation and generate ozone to be inserted into the wash water. An aeration tray is configured to receive the wash water from the oxidation chamber and further oxygenate the wash water. A storage tank is configured to receive the wash water from the aeration tray and store the wash water. A pump is configured to pump the wash water from the storage tank to the bioreactor.

In some embodiments of the system, the third separator is configured to receive the wash water from the bioreactor and separate solids from the wash water. In some embodiments of the system, the third separator has a bottom where the solids settle, and the bottom further has an outlet where the solids can be removed from the third separator and provided to the bioreactor.

In some embodiments of the system, the system also has an organic separator configured to receive the wash water from the storage tank and remove organic solids from the wash water and return the wash water to the storage tank.

In some embodiments of the system, the system also has a cart configured to receive solids from the wash water.

In some embodiments of the system, the first separator contains a filtering element configured to separate solids from the wash water.

In some embodiments of the system, the first separator is configured to supply the wash water to the second separator by gravity flow.

In some embodiments of the system, the second separator is configured to supply the wash water to the bioreactor by gravity flow.

In some embodiments of the system, the bioreactor is configured to supply the wash water to the third separator by gravity flow.

In some embodiments of the system, the bioreactor is configured to supply the wash water to the oxidation chamber by gravity flow.

In some embodiments of the system, the oxidation chamber is configured to supply the wash water to the aeration tray by gravity flow.

In some embodiments of the system, the third separator is configured to supply wash water to the oxidation chamber by gravity flow.

In some embodiments of the system, the second separator has an oil skimmer configured to separate oil from the wash water within the second separator. In some embodiments of the system, the second separator has a bottom where the solids settle, the bottom further having an outlet where the solids can be removed from the second separator.

In some embodiments of the system, the system is self-contained.

In some embodiments of the system, the system is portable.

In some embodiments of the system, the bioreactor has a flow element configured to create a constant flow of the contents within the bioreactor.

In some embodiments of the system, the oxidation chamber has ozone gas generated by the ultra-violet lamp.

In some embodiments of the system, the oxidation chamber has a translucent tube.

In some embodiments of the system, the wash water in the oxidation chamber comes into contact with ozone, ultra-violet radiation and additional oxidizers.

In another aspect of the present invention, a process for recycling of wash water is provided. Wash water is supplied to a first separator configured to receive the wash water. Solids are separated from the wash water. The wash water is supplied from the first separator to a second separator configured to receive the wash water from the first separator. Oil is separated from the wash water. Wash water is supplied from the second separator to a bioreactor configured to receive the wash water from the second separator. The bioreactor contains bacteria. The bacteria consume the solids from the wash water. The wash water is supplied from the bioreactor to an oxidation chamber configured to receive the wash water from the bioreactor. The oxidation chamber has an ultra-violet lamp. The ultra-violet lamp emits ultra-violet radiation into the air and wash water. Ozone is generated and inserted into the wash water. The wash water is sterilized and oxygenated as a result of the application of the ultra-violet energy. The wash water is supplied from the oxidation chamber to an aeration tray configured to receive the wash water from the oxidation chamber. The wash water is further oxygenated. The wash water is supplied from the aeration tray to a storage tank configured to receive the wash water from the aeration tray. The wash water is stored and pumped from the storage tank to the bioreactor.

In other embodiments of the process, the process further comprises supplying the wash water from the bioreactor to a third separator configured to receive the wash water from the bioreactor, and separate solids from the wash water and supply the wash water to the oxidation chamber.

In other embodiments of the process, the process further comprises supplying the wash water from the storage tank to an organic separator configured to receive the wash water from the storage tank, removing organic solids from the wash water and returning the wash water to the storage tank.

In other embodiments of the process, the process further comprises supplying the solids to a cart configured to receive the solids from the wash water.

In other embodiments of the process, the process further comprises supplying the wash water to the second separator by gravity flow. In other embodiments of the process, the process further comprises removing solids from the second separator through an outlet at a bottom of the second separator.

In other embodiments of the process, the process further comprises supplying the wash water to the bioreactor by gravity flow.

In other embodiments of the process, the process further comprises supplying the wash water to the third separator by gravity flow.

In other embodiments of the process, the process further comprises supplying the wash water to the oxidation chamber by gravity flow.

In other embodiments of the process, the process further comprises supplying the wash water to the aeration tray by gravity flow.

In other embodiments of the process, the process further comprises removing solids from the third separator through an outlet at a bottom of the third separator and supplying the solids to the bioreactor.

In other embodiments of the process, the process further comprises supplying the wash water to the oxidation chamber by gravity flow.

In other embodiments of the process, the process further comprises skimming the oil from the wash water within the second separator.

In other embodiments of the process, the process further comprises causing constant flow of the contents within the bioreactor.

In other embodiments of the process, the process further comprises countering the flow of the wash water in the oxidation chamber with the ozone gas.

In other embodiments of the process, the process further comprises generating oxidizers and adding said oxidizers to said wash water.

In another aspect of the present invention, a method for wash water recycling is provided. First, solids are separated from wash water; second, oil is separated from the wash water; third, bacteria consume the solids from the wash water; fourth, ultra-violet radiation is emitted; fifth, ozone is generated; sixth, ozone is inserted into the wash water; seventh, the wash water is oxygenated; eighth, the wash water is pumped; ninth, the wash water is stored.

In other embodiments of the method, the method further comprises removing organic solids from the wash water.

In other embodiments of the method, the method further comprises supplying the wash water by gravity flow.

In other embodiments of the method, the method further comprises skimming oil from the wash water.

In other embodiments of the method, the method further comprises inserting oxidizers into the wash water.

In yet another aspect of the present invention, a method for wash water recycling is provided. Wash water is supplied to, for example, the above described system for wash water recycling.

Further advantages, characteristic features and the modes of use of embodiments of the present disclosure will become clear from the following detailed description of embodiments thereof, provided solely by way of non-limiting examples. It is also to be understood that the scope of the present disclosure includes all the possible combinations of the embodiments mentioned above and those described with reference to the following detailed description.

The above and other aspects and embodiments are described below with reference to the accompanying drawings.

BRIEF DESCRIPTION OF THE DRAWINGS

The accompanying drawings, which are incorporated herein and form part of the specification, help illustrate various embodiments of the present disclosure and, together with the description, further serve to explain the principles of the invention and to enable a person skilled in the pertinent art to make and use the embodiments disclosed herein. In the drawings, like reference numbers indicate identical or functionally similar elements.

FIG. 11b is a perspective view of the organic separator as it resides in the overall system of FIG. 1.

DETAILED DESCRIPTION OF THE PREFERRED EMBODIMENTS

System and Components

Figure 1:
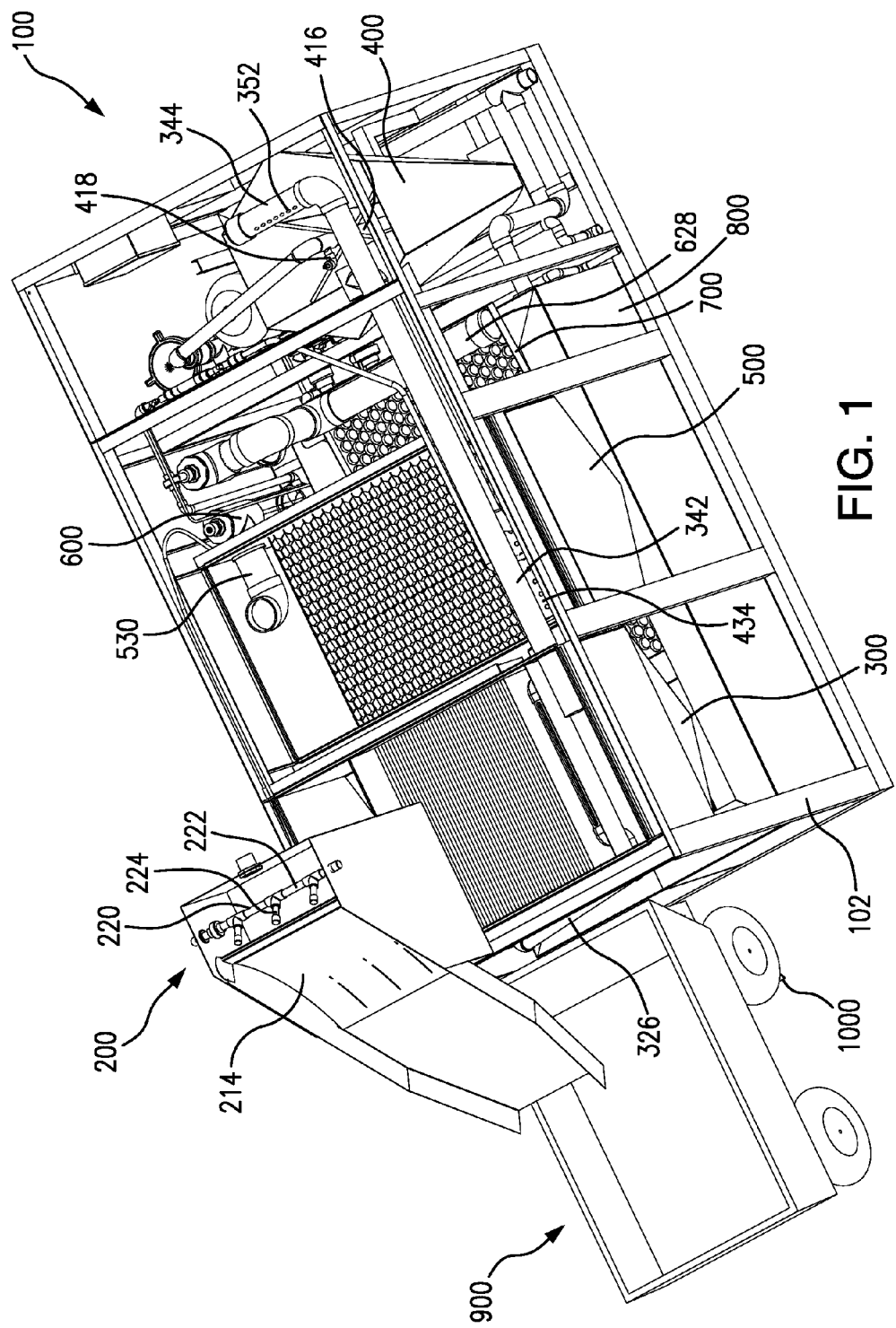
FIG. 1 is a perspective view of a wash water recycling system in accordance with an embodiment of the present invention.

Referring now to the drawings, FIG. 1 illustrates a system 100 for wash water recycling comprising a first separator 200, second separator 300, bioreactor 400, third separator 500, oxidation chamber 600, aeration tray 700, and storage tank 800.

The system 100 has a frame 102 that secures the first separator 200, second separator 300, bioreactor 400, third separator 500, oxidation chamber 600, aeration tray 700, and storage tank 800 and other system components (such as pipes, channels, hoses, pumps, etc.) into position.

The system 100 also has an outer skin (not shown), which may be made, for example, of stainless steel, that covers the outer portion of the frame and protects the system and system components within the frame.

The system 100 described herein may be closed-loop, self-contained, portable, and operate very quietly (i.e. barely audible to a person standing next to the system while the system is in operation).

Figure 2A:
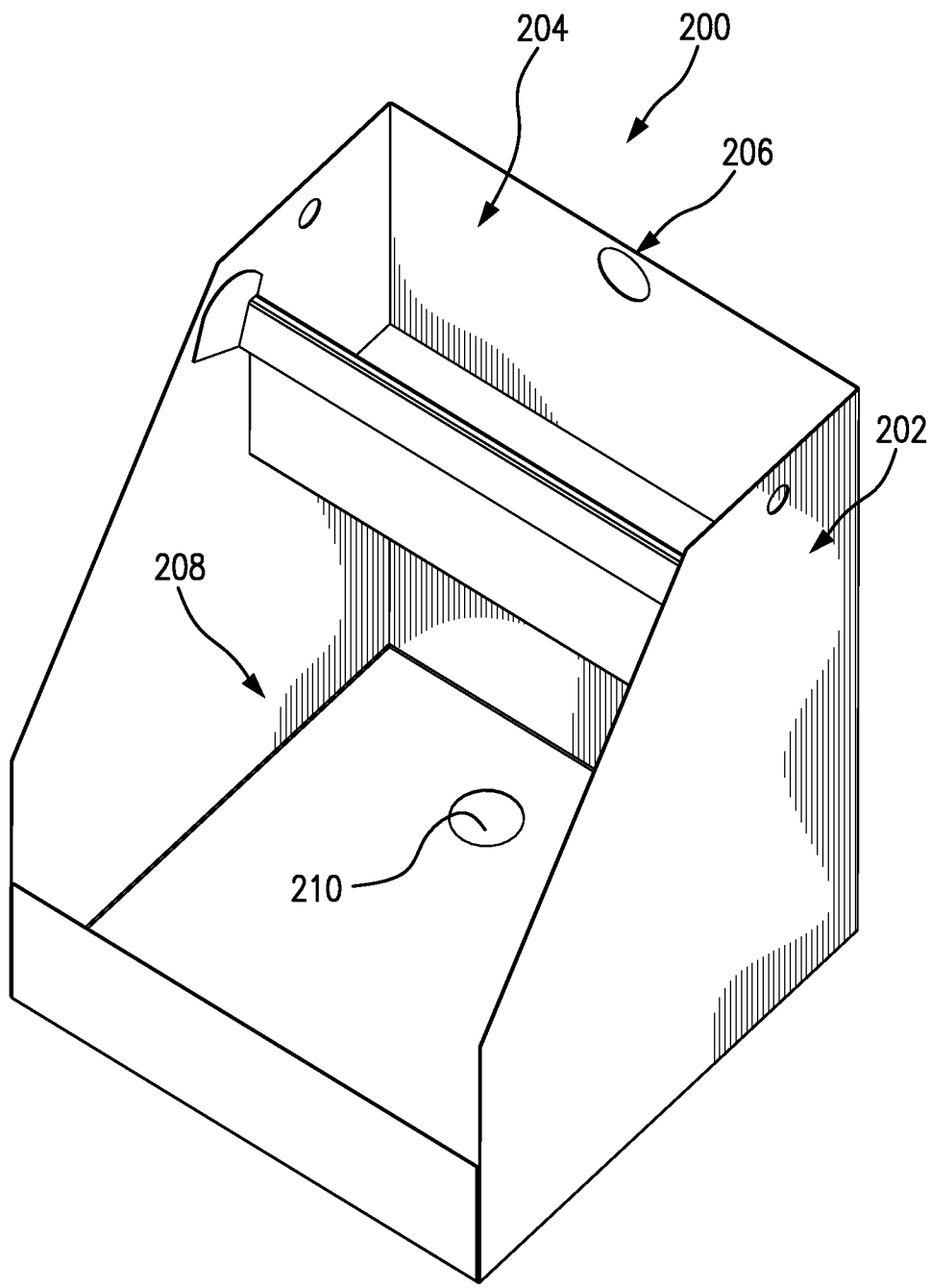
FIG. 2a is a perspective view of a first separator used in the system of FIG. 1.

FIG. 2a illustrates the first separator frame 202. As shown in FIG. 2a, the frame may be rectangular and box-like, with four walls and an open top. The first separator frame may also include two chambers. The first chamber 204 may include four walls and a bottom, and may be located in the upper portion of the first separator frame. The first chamber may also have an inlet 206 opening configured to support an inlet pipe (not shown). The second chamber may have four walls and a bottom, and may be located in the lower portion of the first separator frame. The second chamber 208 may have an outlet 210 at its bottom configured to support an outlet pipe (not shown).

Figure 2B:
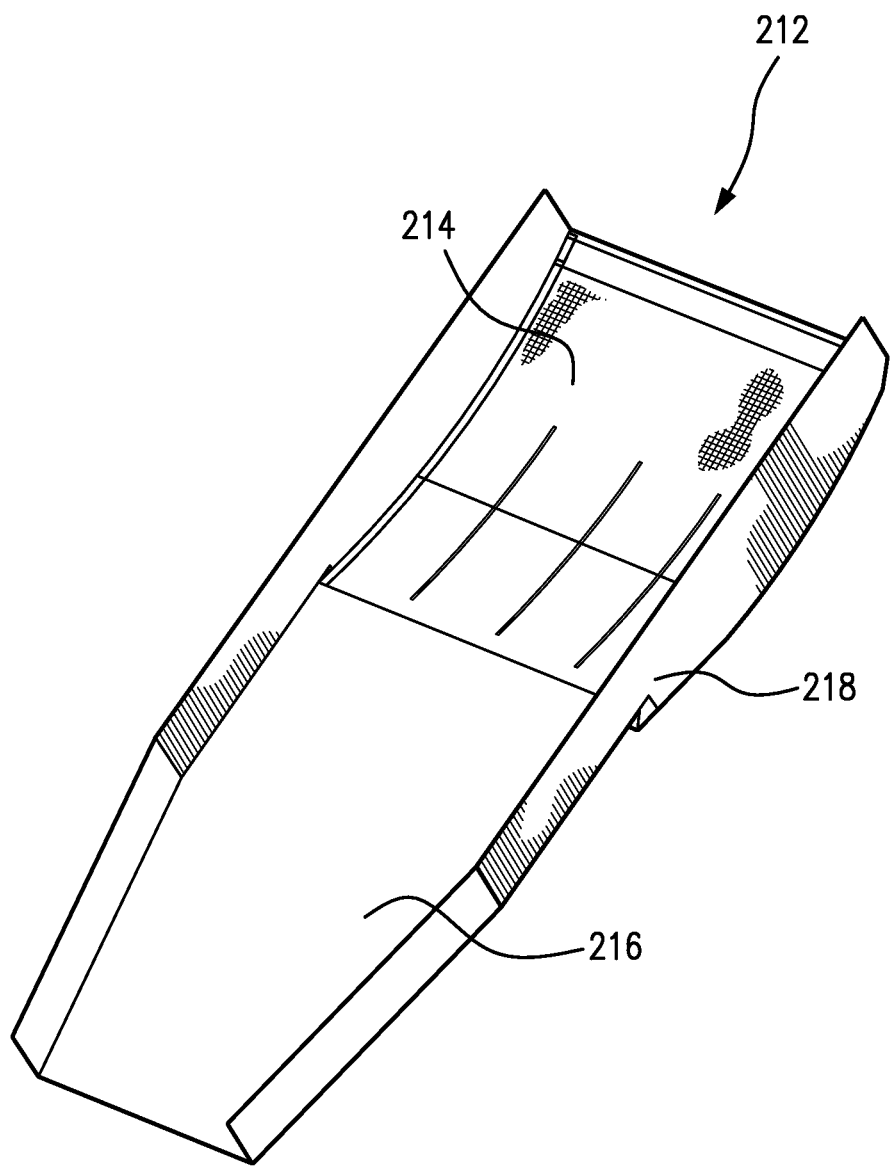
FIG. 2b is a perspective view of a first separator screen assembly used in the system of FIG. 1.

FIG. 2b illustrates the first separator screen assembly 212. The first separator screen assembly 212 may have a screen portion 214 (configured to filter out solids), a chute 216, and a frame portion 218. The upper portion of the frame 218 may be configured to attach to the first separator frame 202. The separator screen portion 214 may be positioned over the second chamber 208 when attached to the first separator 200 (as shown in FIG. 1).

As shown in FIG. 1, the first separator 200 also may have a wash assembly 220 that may be positioned above the first chamber 204 and behind the screen portion 214. The wash assembly may have a lateral pipe 222 and a plurality of wash nozzles 224 attached to the pipe 222 that periodically supply pressurized wash water spray to clean solids from the screen 214.

Figure 3A:
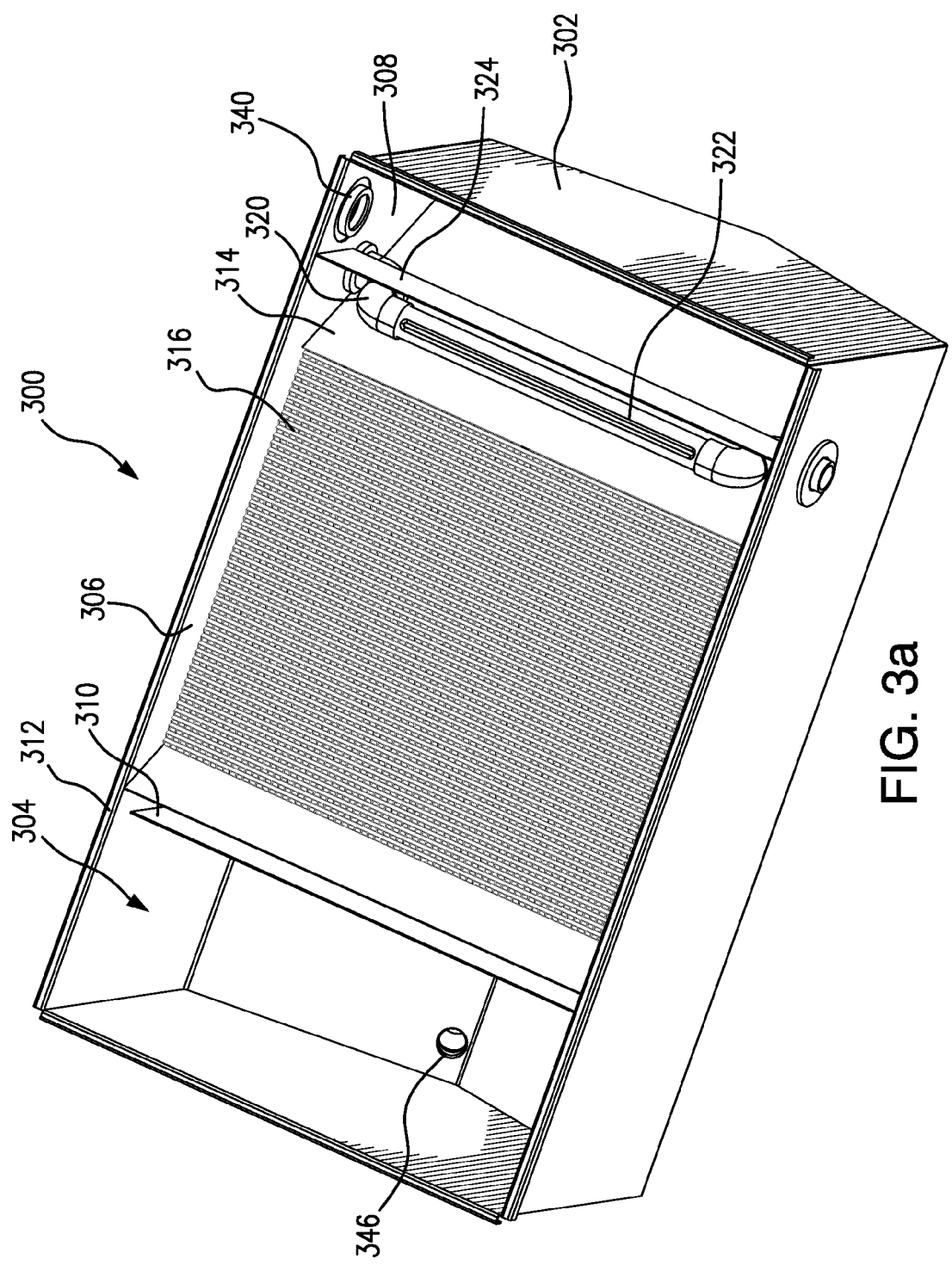
FIG. 3a is a perspective view of a second separator used in the system of FIG. 1.

FIG. 3a illustrates the second separator 300. The second separator may have a rectangular, box-like body 302 with four walls and a "V" shaped bottom. The second separator may have three chambers 304 306 308. The second separator may have a first flat plate 310 that separates the first chamber 304 from the second chamber 306. The top edge of the first flat plate 310 may be positioned below the plane created by the upper edge of the second separator walls 312. The second separator may have a second flat plate 314 that separates the second chamber 306 from the third chamber 308. The top edge of the second flat plate may be positioned below the plane created by the upper edge of the second separator walls 312.

Figure 3B:
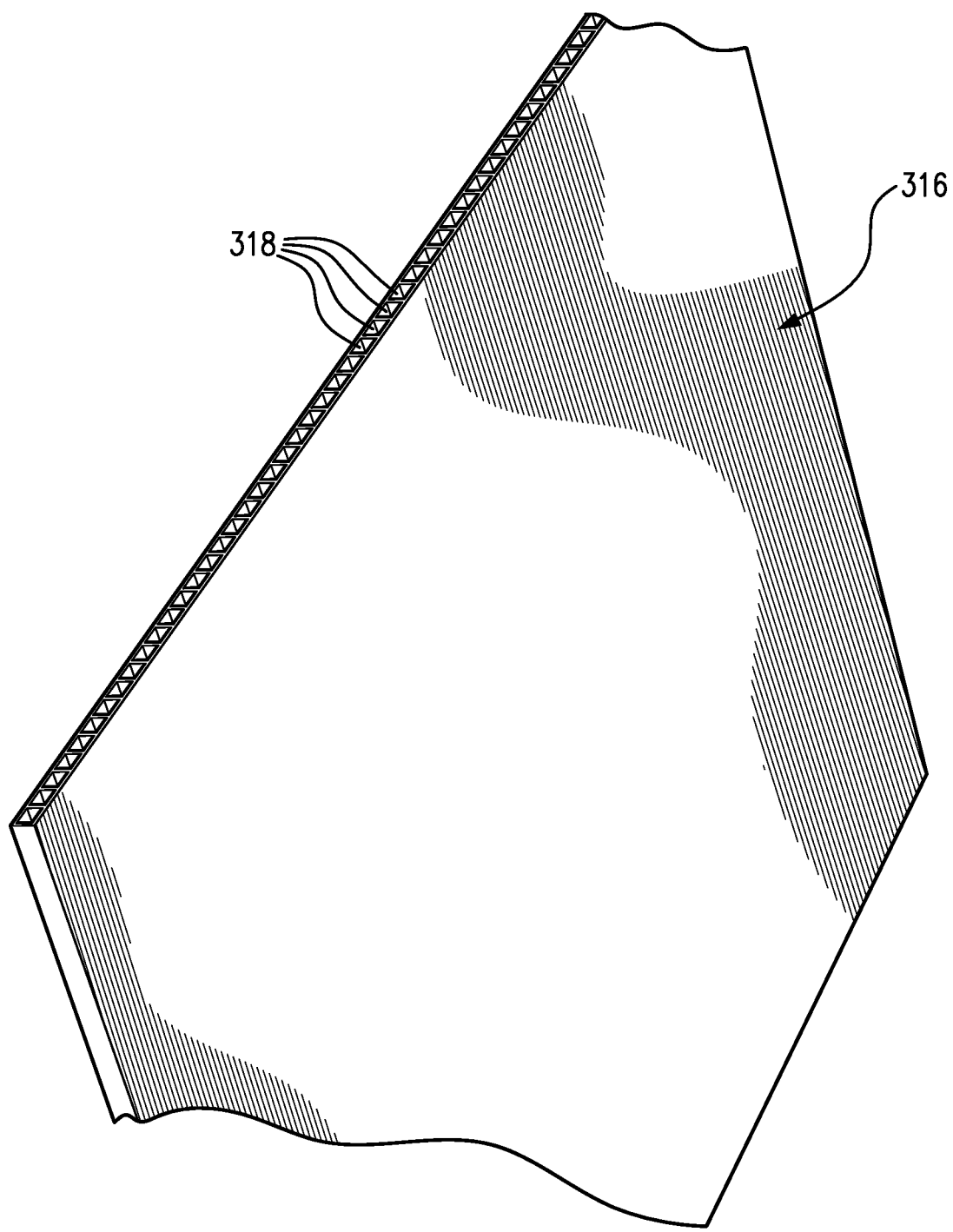
FIG. 3b. is a perspective view of a first separator coalescing grid used in the system of FIG. 1.

The second chamber may contain multiple inclined hydrocarbon coalescing grids 316 positioned vertically and at an angle non-perpendicular to the plane of the base of the system 100, preferably at 60°. The coalescing grids 316 may contain a plurality of square or tubular columns 318 as shown in FIG. 3b. The coalescing grids 316 may be made of, for example, polypropylene or similar materials that carry a charge to attract oil.

Figure 3C:
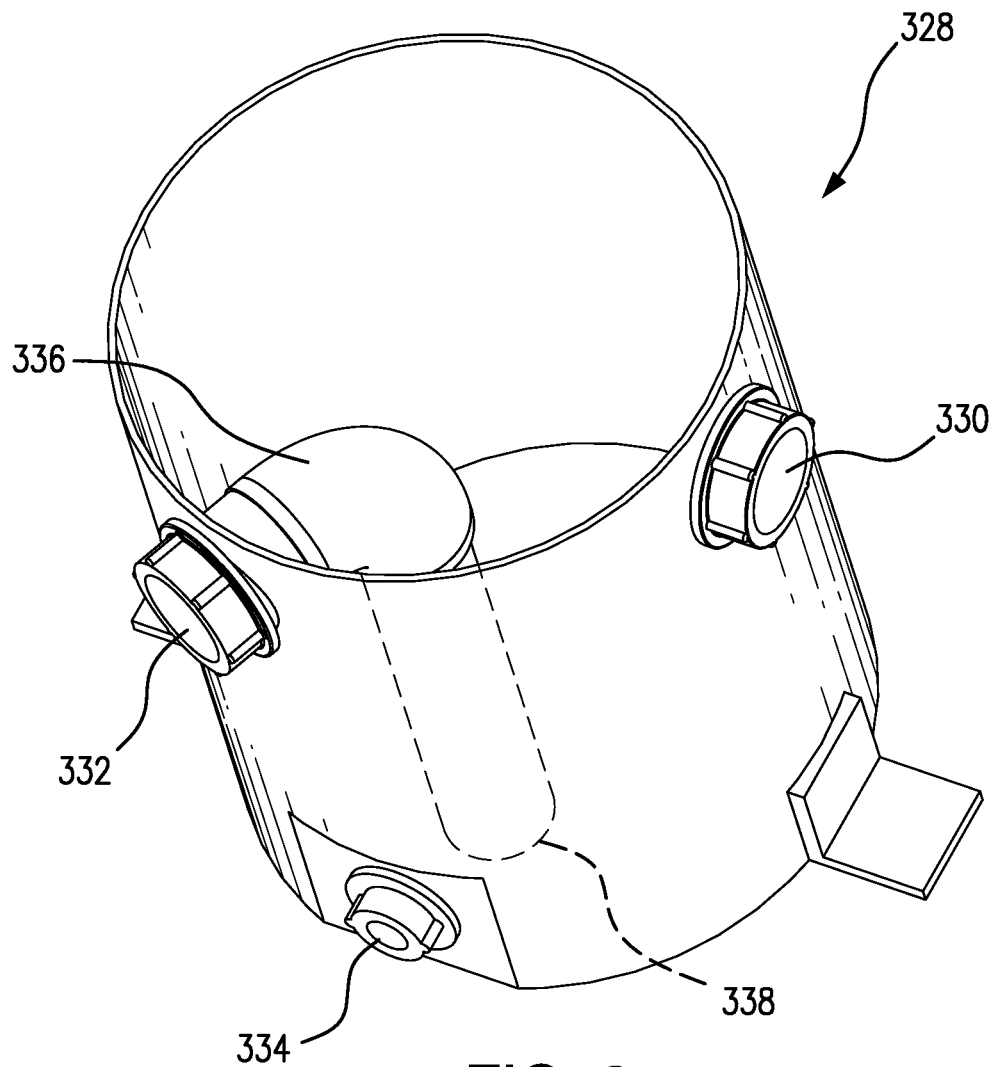
FIG. 3c. is a perspective view of a hydrocarbon accumulator used in the system of FIG. 1.

The second separator 300 may have an oil skimmer 320 positioned above and just beyond the back of the second chamber 306, and above and in the frontal portion of a third chamber 308. The oil skimmer 320 may have an elongated opening 322 along a significant portion of its length. The second separator also may have an oil dam plate 324 located behind the oil skimmer 320. The oil skimmer 320 may have a pipe assembly 326 connected to the skimmer that may be attached to a hydrocarbon accumulator 328 (FIGS. 1 and 3c).

The hydrocarbon accumulator 328 is shaped like a drum, and may have an inlet 330, an outlet 332 and a drainage valve 334. The hydrocarbon accumulator outlet 332 may have an outlet pipe assembly 336 that extends within the center of the accumulator 328 and has an opening 338 near the bottom of the accumulator 328.

The second separator may have an outlet 340 on the side of the third chamber 308 configured to receive an outlet pipe 342 (see FIGS. 3a and 1). The outlet pipe 342 may have a distal end portion 344 that may contain a plurality of holes 352 along the distal end portion's bottom length. The outlet pipe may be positioned along a portion of the length of the system 100 toward the bioreactor 400 at a slight angle downward to facilitate gravity flow of the wash water. The distal end portion 344 of the pipe may be laterally positioned over the top of the bioreactor 400.

The second separator 300 may also have two outlets located at the bottom of the second separator, with a first outlet 346 that may be located at the bottom of the first chamber 304, and a second outlet that may be located at the bottom of the second chamber 306 (not shown). Both outlets may be configured to receive outlet pipes (not shown) for drainage of solids.

Figure 4A:
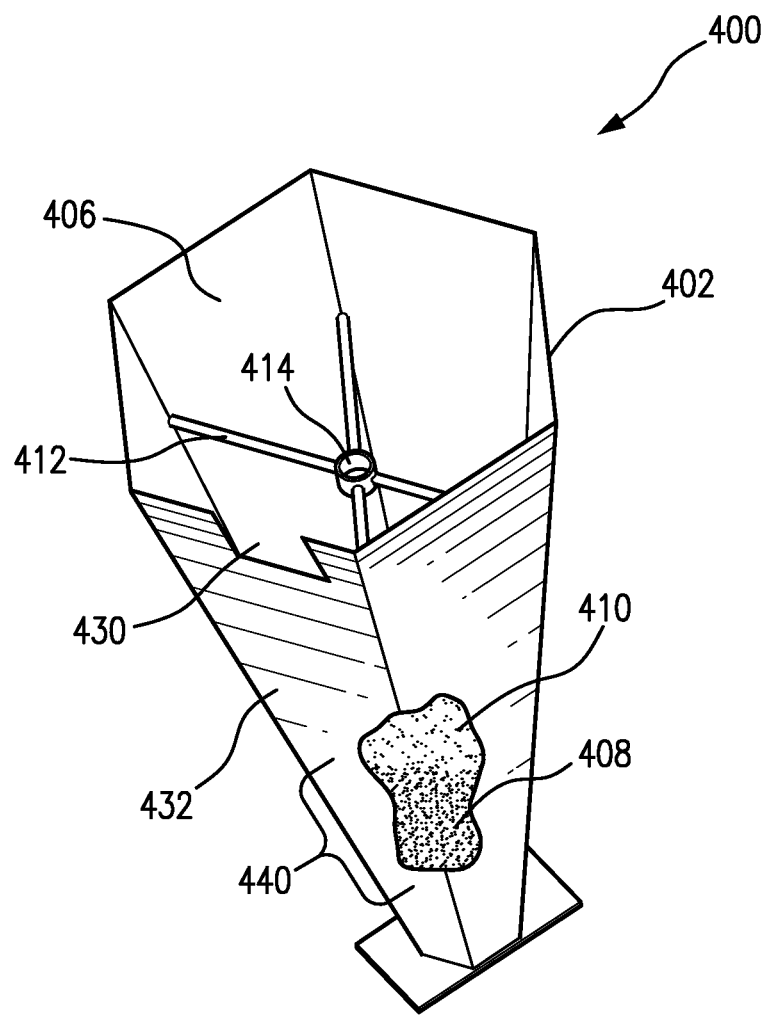
FIG. 4a is a perspective view of a bioreactor used in the system of FIG. 1.

FIG. 4a illustrates the bioreactor 400. The bioreactor 400 may have a hollow cone-like housing 402 creating its main chamber 406. The bioreactor chamber 406 may have a wider opening at the top, tapering to a narrower cross-sectional length at its base. The cone-like housing 402 may have a geometric cross-sectional shape, shown in this embodiment as a hexagon. The bioreactor may contain media 408, in this embodiment in the form of grains of sand; each grain can be the same size. The bioreactor may also contain naturally occurring bacteria 410 (i.e. bacteria that are already resident on the grass and other solids washed off of equipment, for example). In an embodiment, commercially obtained bacteria would not be added to the bioreactor or system in any way, saving the cost of purchasing bacteria and allowing for better reduction of solids (because it has been found that naturally occurring bacteria are typically more effective at consuming the specific solids in the bioreactor than other bacteria).

Figure 4B:
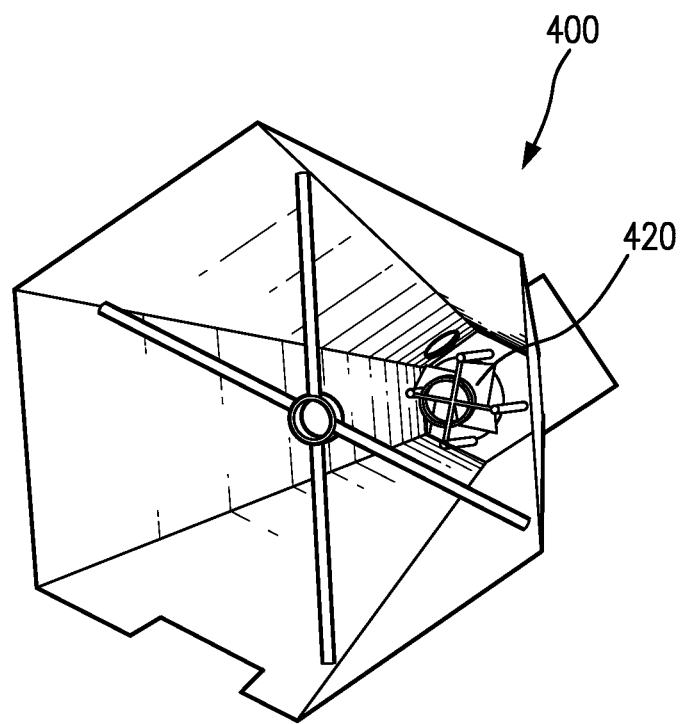
FIG. 4b is a perspective view of a bioreactor with flow element used in the system of FIG. 1.
Figure 4C:
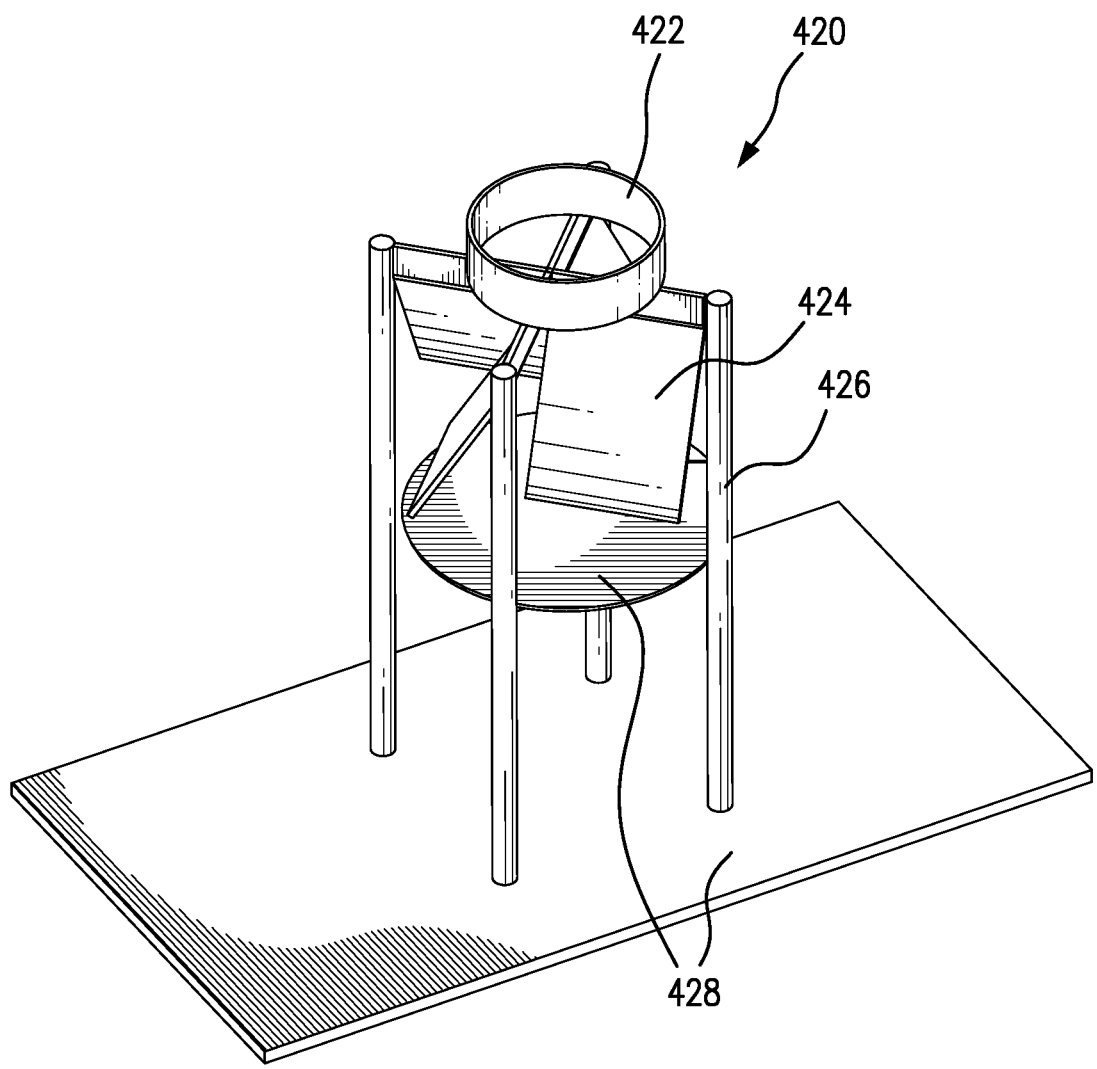
FIG. 4c is a perspective view of a flow element used in the system of FIG. 1.

The bioreactor chamber may have reinforcing cross beams 412 near the top of the chamber 406, with a center collar 414 that can be configured to secure a vertical portion of an inlet pipe 416 (as shown in FIG. 1). The inlet pipe 416 may have a needle valve "Venturi" inlet 418 allowing entry of air. As shown in FIGS. 4b and 4c, the bioreactor may also have a flow device 420 that is fixed at the bottom of the bioreactor chamber 406. The flow device 420 may have a collar 422 that receives part of the end portion of the inlet pipe 416, and a plurality of angled flanges 424. The flow device may also have a plurality of legs 426 and structural plates 428, providing the flow device 420 with structural integrity and allowing the flow device 420 to remain fixed at the bottom of the chamber 406.

Figure 4D:
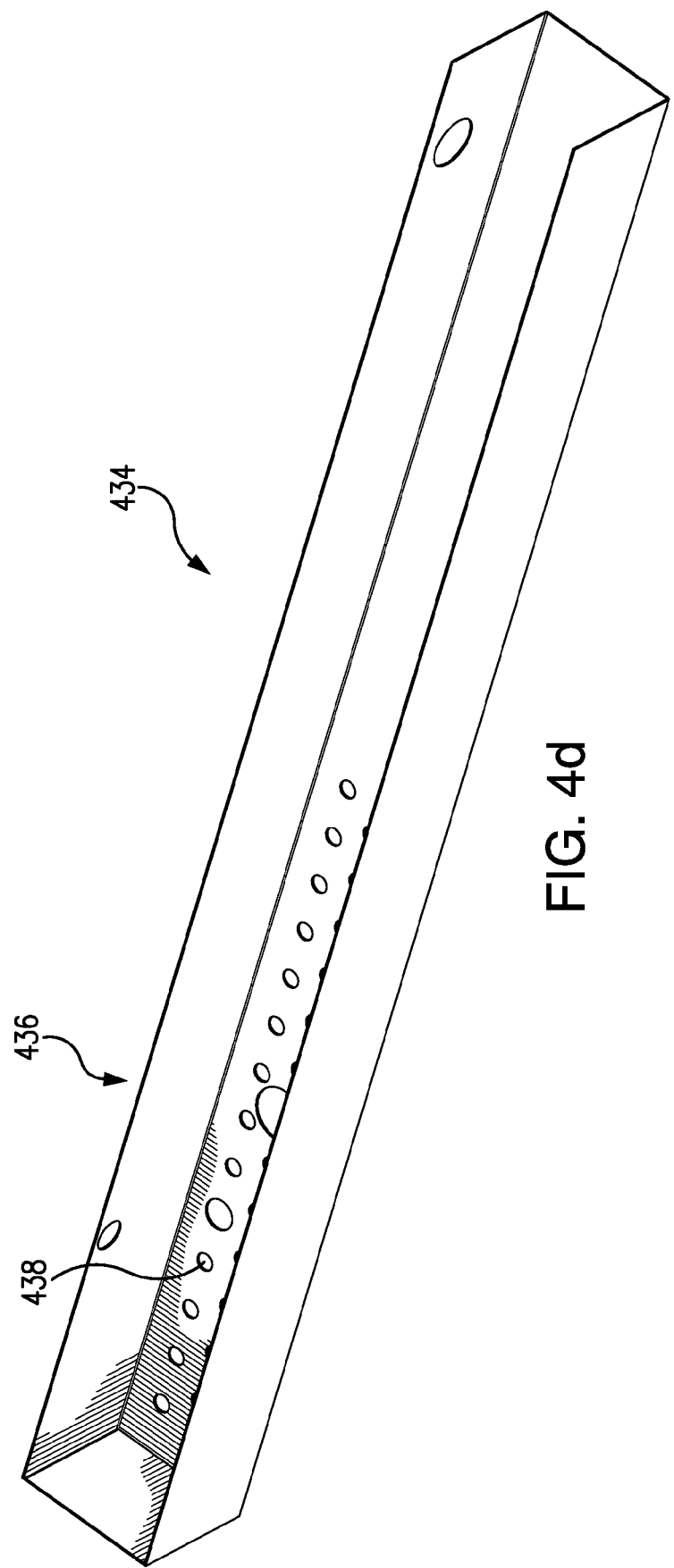
FIG. 4d is a perspective view of an outlet channel used in the system of FIG. 1.

As shown in FIG. 4a, the bioreactor chamber may have an outlet notch 430 located at the top of one of the chamber walls 432, forming an outlet notch 430 region below the upper surface of one of the chamber walls 432. The outlet notch 430 may be configured to secure an outlet channel 434 (see FIGS. 4d and 1). The outlet channel 434 may be positioned along a portion of the length of the system 100 toward the third separator 500 at an angle slightly downward to facilitate gravity flow of the wash water. As shown in FIG. 4d, the lateral end portion 436 of the channel 434 may have a plurality of holes 438 contained along its bottom. The lateral end portion 436 of the inlet channel 434 may be positioned over the top of the third separator 500 in the system 100.

Figure 5A:
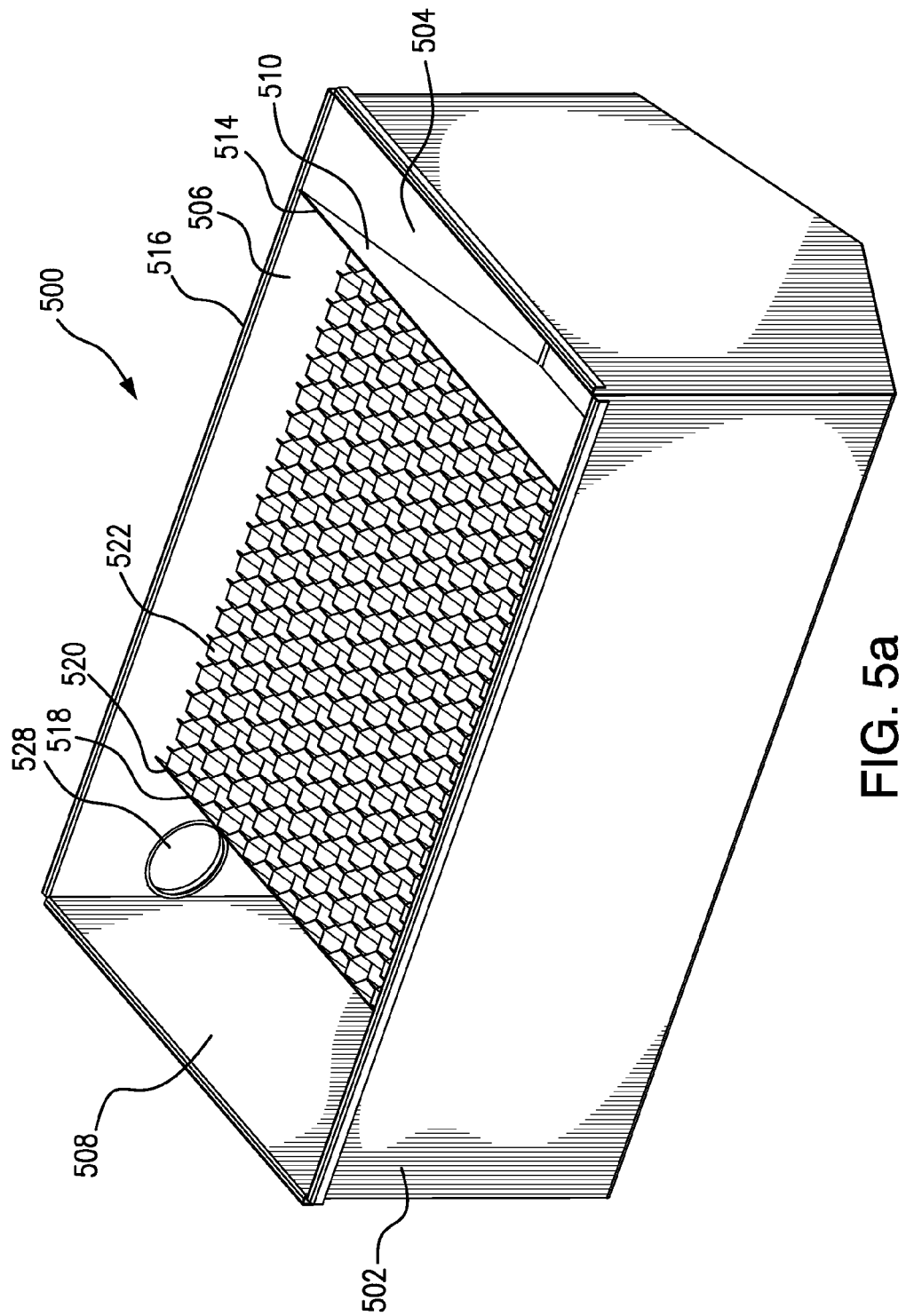
FIG. 5a is a perspective view of a third separator used in the system of FIG. 1.
Figure 5B:
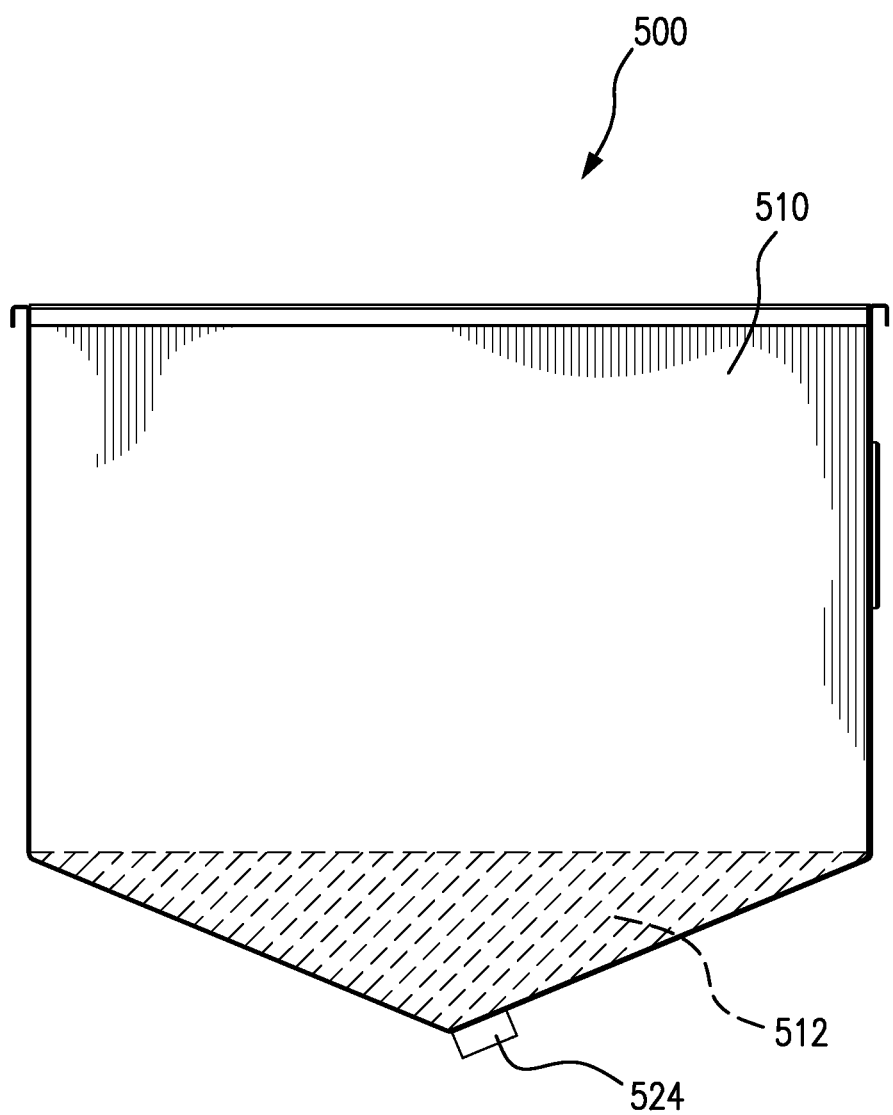
FIG. 5b is a front side view of a third separator and first flat plate used in the system of FIG. 1.

FIG. 5a illustrates the third separator 500. The third separator may have a rectangular, box-like body 502 with four walls and a "V" shaped bottom. The third separator 500 may have three chambers 504 506 508. The third separator may have first flat plate 510 that separates the main part of the first chamber 512 from the second chamber 506, but does not separate the bottom region between the first chamber 504 and second chamber 506. That is, there may be an opening 512 at the bottom region between the first chamber 504 and second chamber 506 and underneath the first flat plate 510 (FIG. 5b). The top edge 514 of the first flat plate 510 may be positioned at the plane created by the upper edge of the third separator walls 516. The third separator 500 may have a second flat plate 518 that separates the second chamber 506 from the third chamber 508. The top edge 520 of the second flat plate 518 may be positioned below the plane created by the upper edge of the third separator walls 516.

Figure 5C:
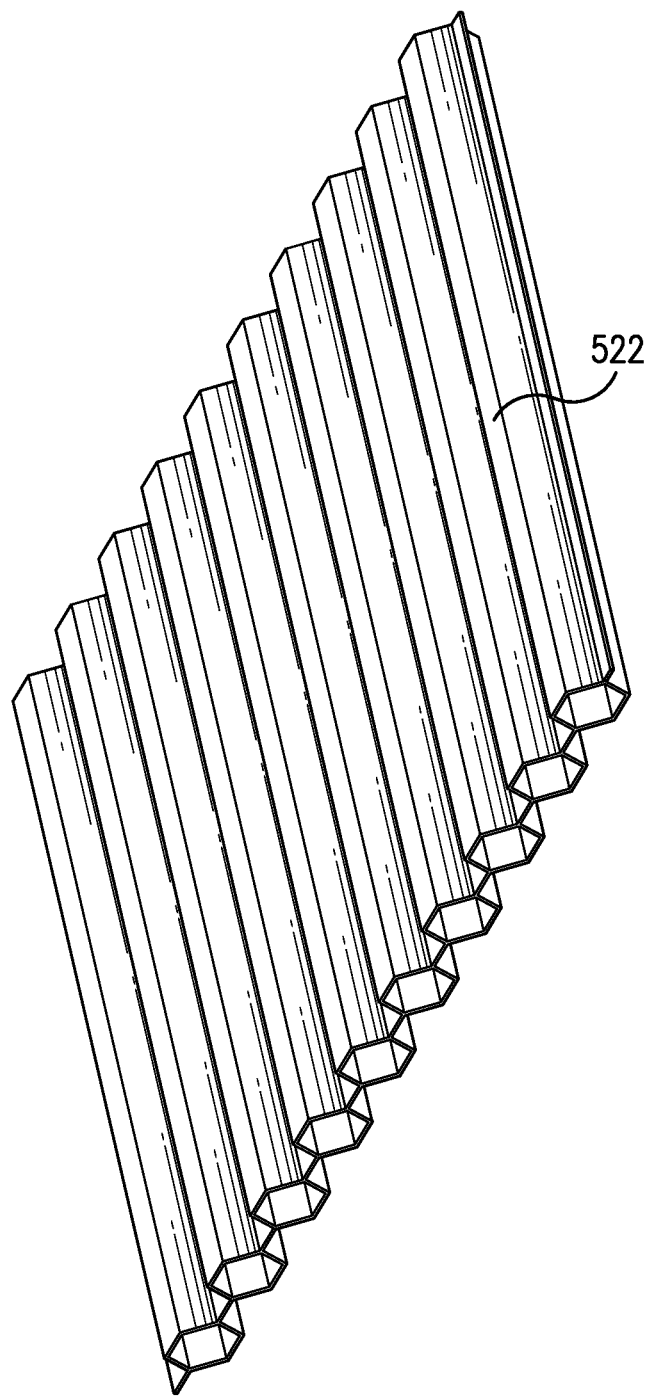
FIGS. 5c and 5d are perspective views third separator corrugated plates used in the system of FIG. 1.
Figure 5D:
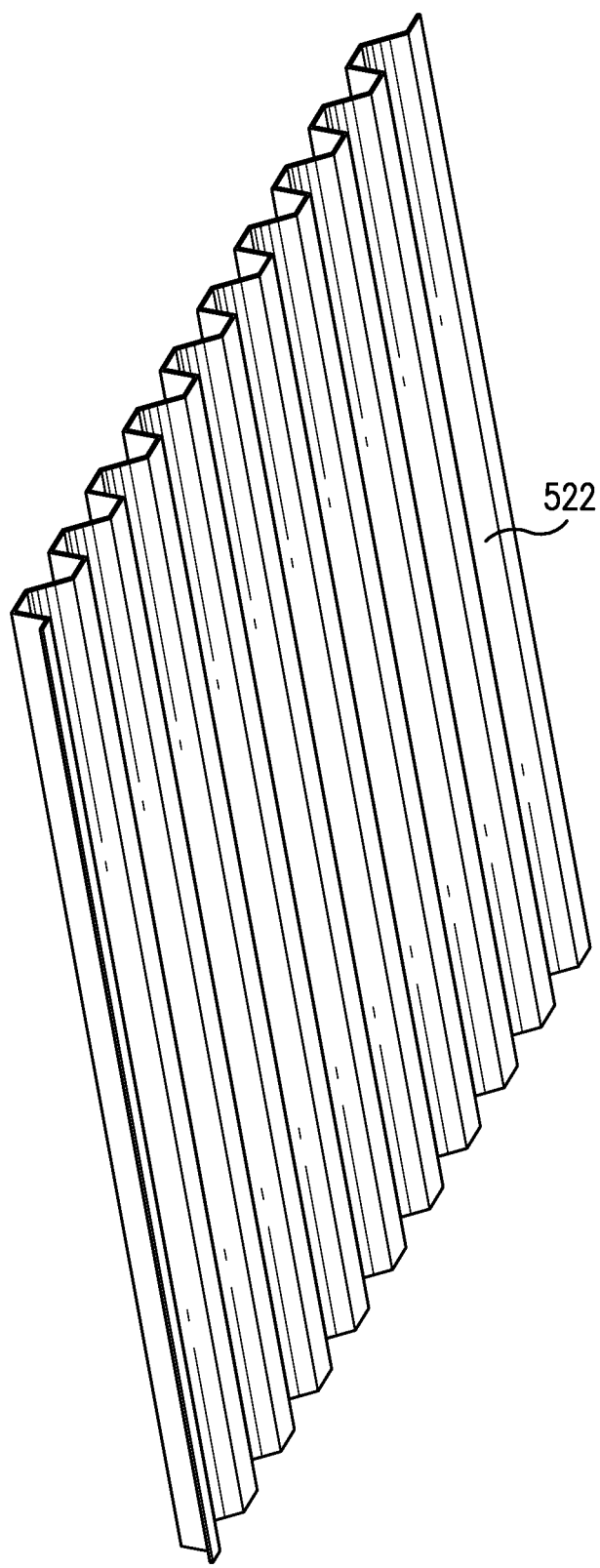

The second chamber 506 of the third separator 500 may have multiple inclined corrugated plates 522 (as shown in FIGS. 5c and 5d) positioned vertically and at an angle non-perpendicular to the plane of the base of the system 100, preferably at 60°. In this embodiment the corrugated plates 522 may be made of a non-charged material, such as fiberglass. The second chamber 506 may also have an outlet 524 at its bottom configured to receive an outlet pipe (not shown).

The third chamber 508 may be configured to collect wash water and has an outlet 528 located on its side that can be configured to receive an outlet pipe 530, as shown in FIG. 1. The outlet pipe 530 may be positioned downward and into the oxidation chamber 600.

Figure 6A:
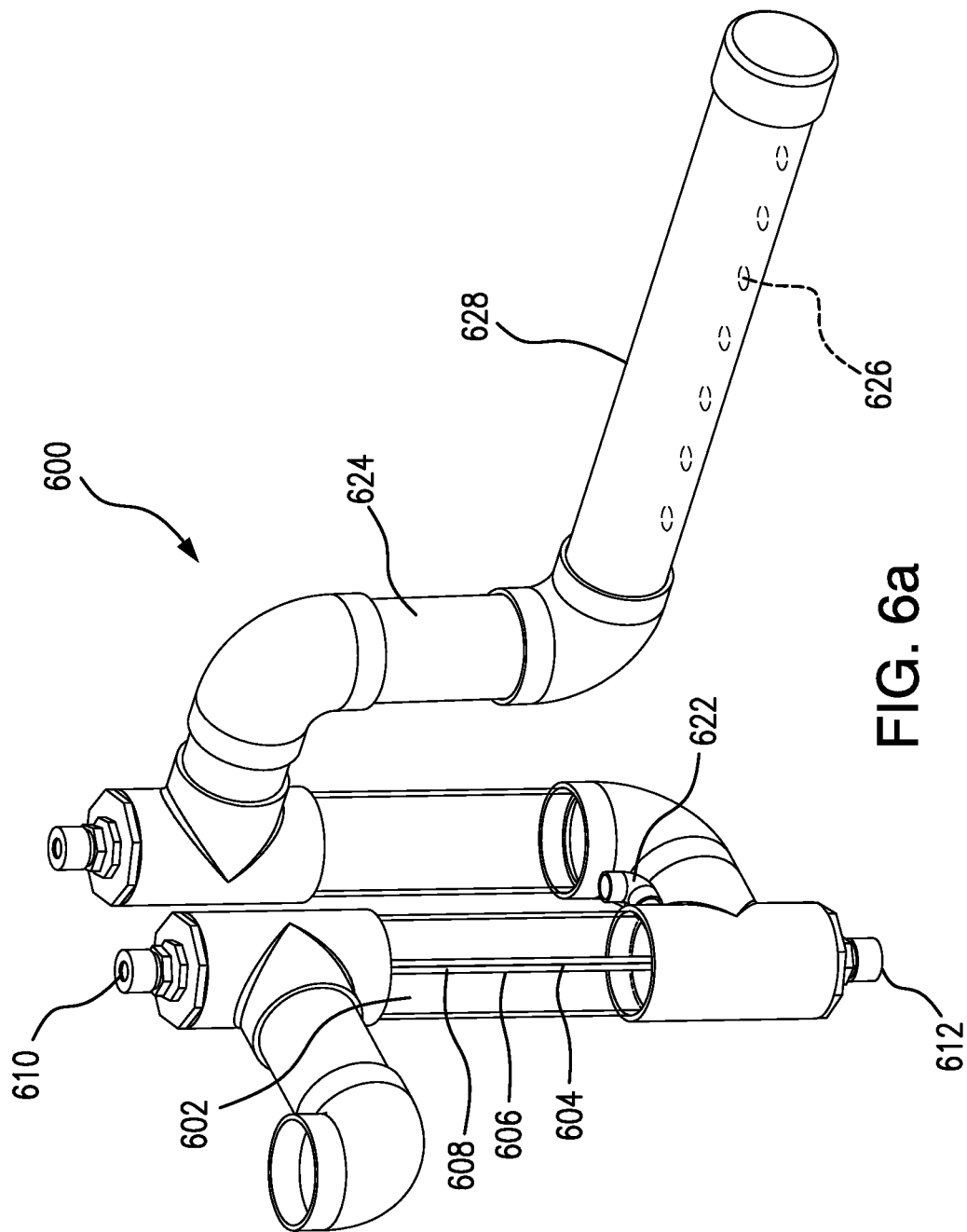
FIG. 6a is a perspective view of an oxidation chamber used in the system of FIG. 1.
Figure 6B:
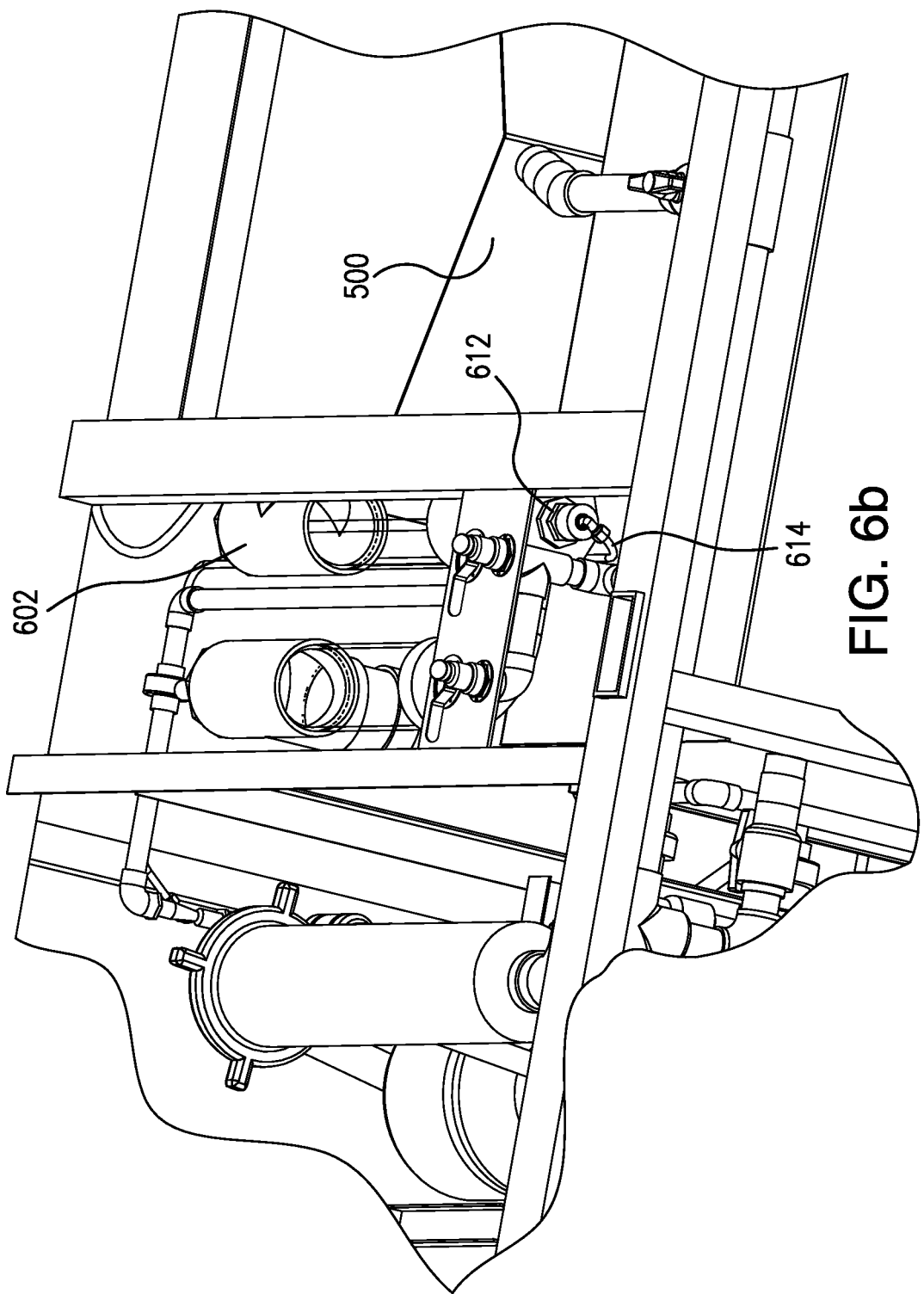
FIG. 6b is a perspective system view of the location and configuration of the oxidation chamber as it resides in the system of FIG. 1.

FIG. 6 illustrates the oxidation chamber 600. The oxidation chamber 600 may be comprised of one or more vertical chambers 602. The oxidation chamber 600 may also be comprised of an ultra-violet lamp 604, that may be positioned within the vertical chamber 602 and along the center of the vertical chamber 602. The ultra-violet lamp 604 may be surrounded by a water-tight, translucent tube 606 (preferably made of quartz), with an air space 608 within the translucent tube 606. The translucent tube 606 can have a poly-protective coating made from a fluorocarbon material that allows ultra-violet light to pass through the tube 606 and creates a non-polar surface on the surface of the tube 606 so that material does not stick to the surface of the tube 606.

Figure 6C:
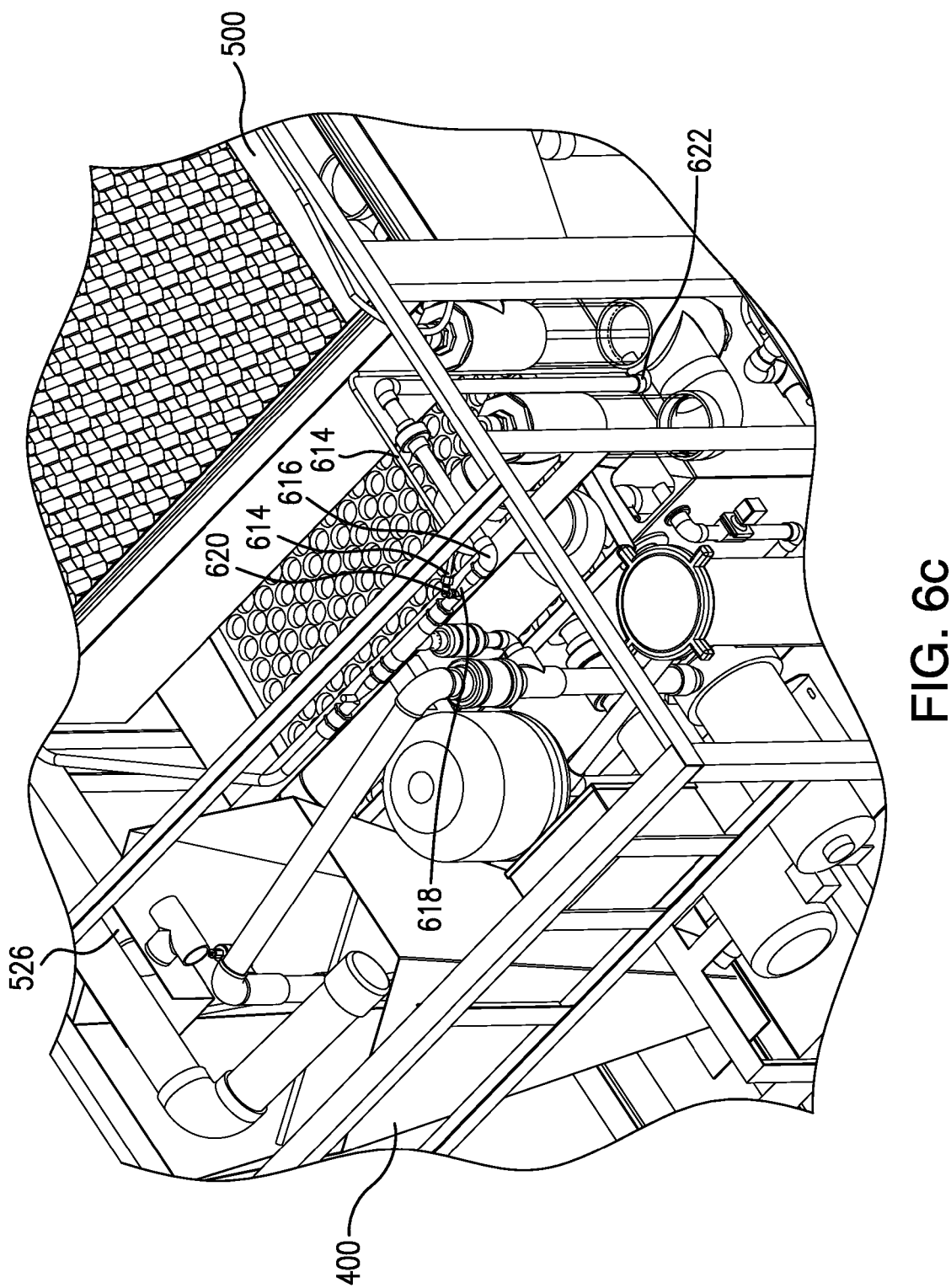
FIG. 6c is another perspective system view of the location and configuration of the oxidation chamber and other components as they reside in the system of FIG. 1.

Air may be supplied into the translucent tube 606 through an inlet 610 at the top of the vertical chamber 602. Ozonated air may be generated by the ultraviolet energy supplied to the air in the translucent tube 606. The ozonated air may exit the translucent tube through an outlet 612 at the bottom of the vertical chamber 602 through a hose assembly 614 to a wash water inlet pipe 616 (as shown in FIG. 6c). The inlet pipe may have a Venturi valve 618 and inlet 620. The wash water inlet pipe 616 can connect to an ozonated wash water supply inlet 622 located at the bottom of the vertical chamber 602 of the oxidation chamber 600 (as shown in FIGS. 6a and 6c).

The oxidation chamber 600 also may have an outlet pipe assembly 624. The outlet pipe assembly 624 may contain a plurality of holes 626 at a length along its distal end 628, which may be positioned horizontally above the aeration tray 700 (as shown in FIG. 1).

Figure 7A:
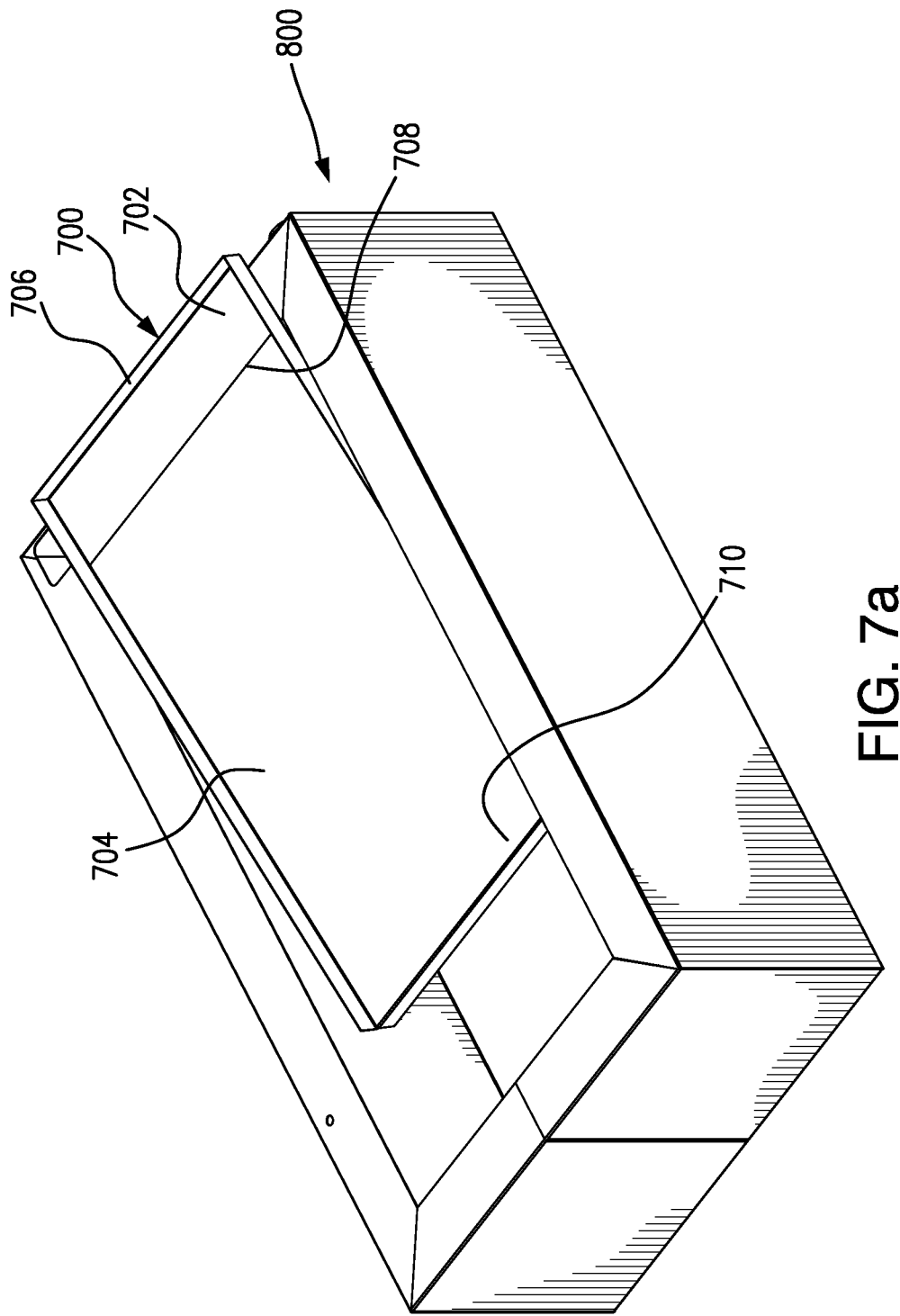
FIG. 7a is a perspective view of the aeration tray and storage tank used in the system of FIG. 1.
Figure 7B:
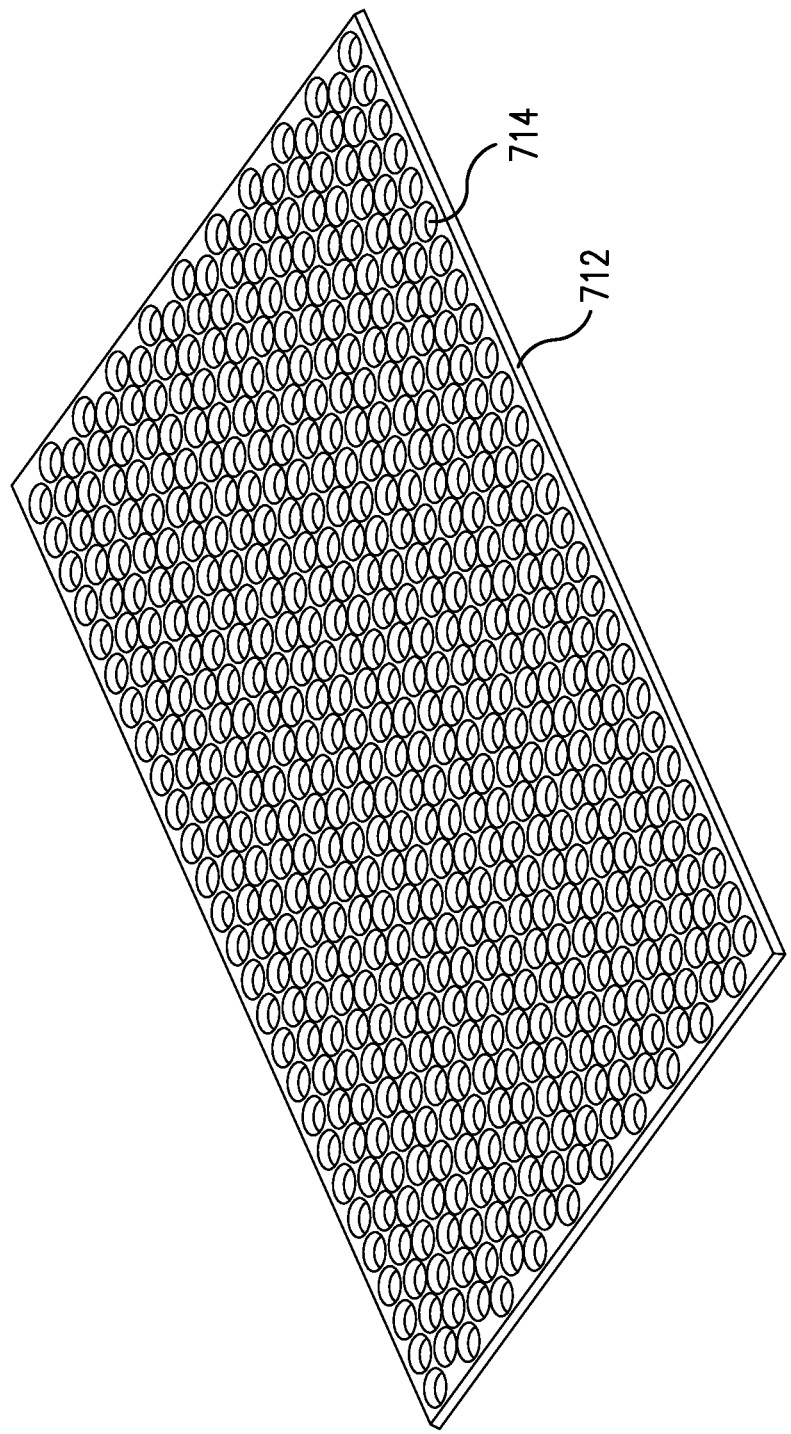
FIG. 7b is a perspective view of the aeration mat used in the system of FIG. 1.

FIG. 7a illustrates the aeration tray 700 as positioned in the storage tank 800. The aeration tray body 702 may have a rectangular bottom 704 and four short walls 706. The aeration tray 700 may be positioned at an angle, with its top portion 708 positioned underneath the distal end 628 of the oxidation chamber pipe assembly 624, and its bottom portion 710 positioned at the bottom of the storage tank 800. The aeration tray 700 may have an aeration mat 712 (as shown in FIG. 7b). The aeration mat has a thickness and may contain a plurality of circular holes 714 through the thickness of the mat.

Figure 8:
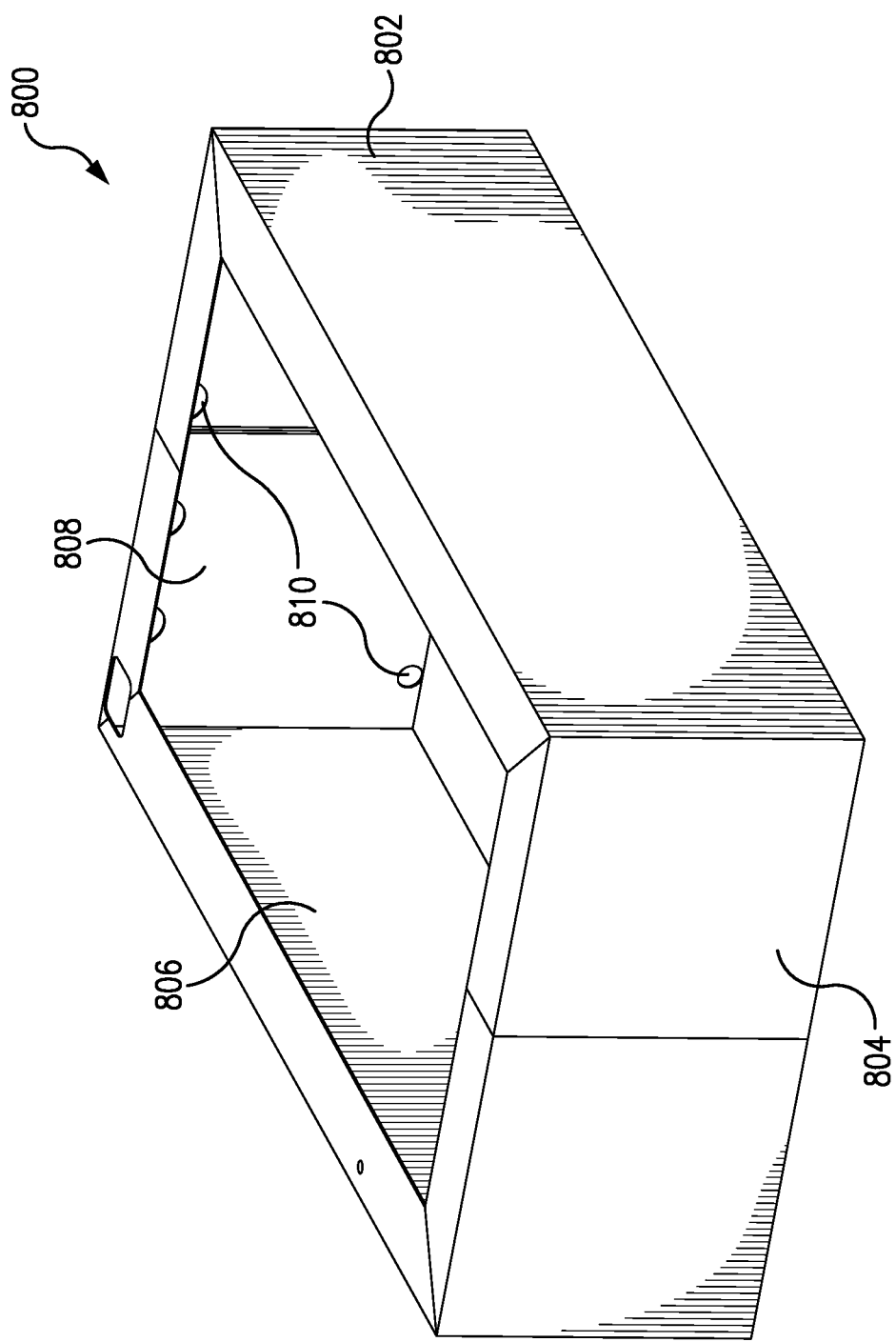
FIG. 8 is a perspective view of the storage tank used in the system of FIG. 1.

FIG. 8 illustrates the storage tank 800. The storage tank 800 may be located at the base of the system 100 and secured to the frame 102. The storage tank 800 may have a box-like body 802 with four walls 804, creating a chamber 806 to hold and store wash water. The storage tank 800 can also have a substantially open top, with an open center portion 808. The storage tank 800 may also have a plurality of inlets and outlets 810, for the supply of wash water both in and out of the storage tank 800.

Figure 9:
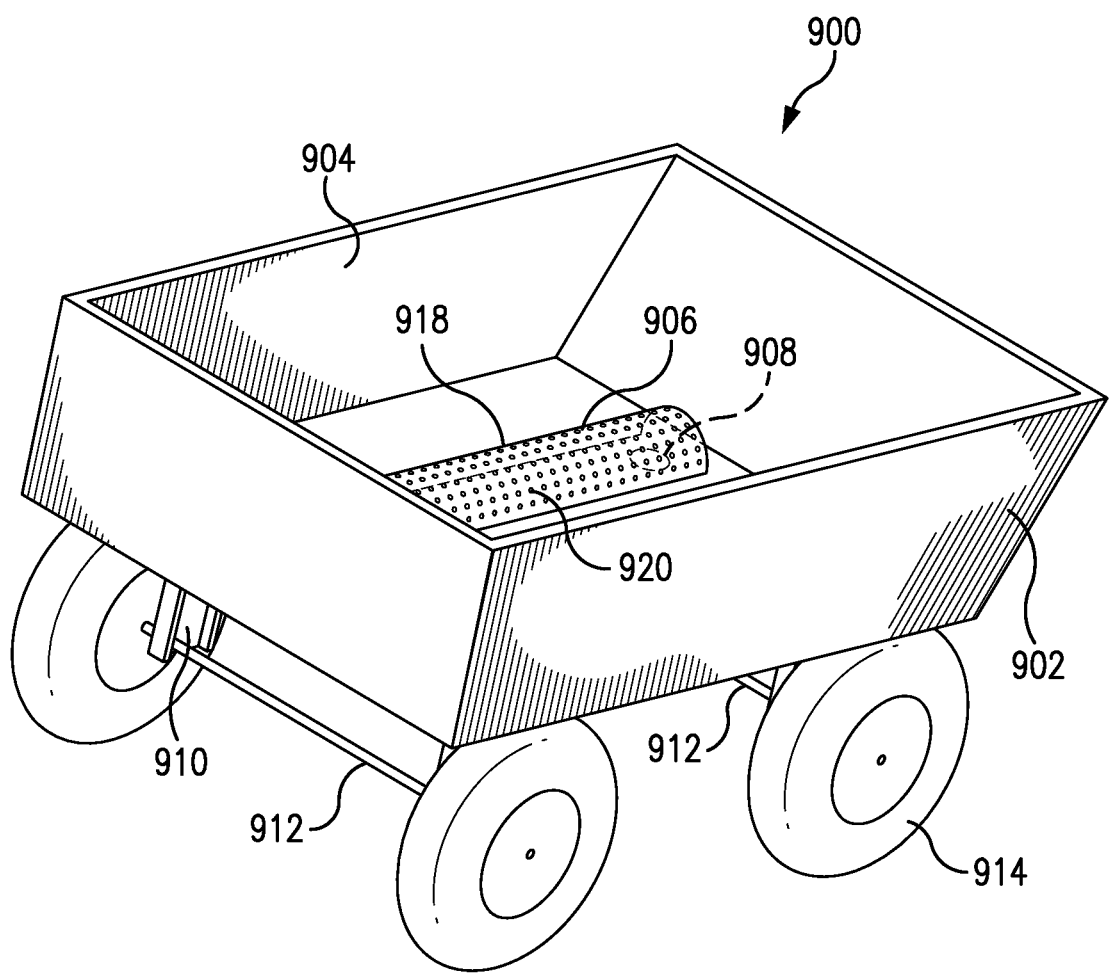
FIG. 9 is a perspective view of the separator cart used in the system of FIG. 1.

FIG. 9 illustrates the system's separator cart 900. The separator cart body 902 may have four sides 904 and a bottom 906. The bottom 906 may have a drainage hole 908 positioned near the front of the cart 900. The drainage hole 908 can be covered with a dewatering screen 918 positioned over the drainage hole 908 of the cart 900. The dewatering screen 918 can have a plurality of holes 920 and shaped in an inverted U shape and placed inside the length of the entire cart 900, creating a large area for debris to dewater and allowing only water to drain out of the hole 908. The cart body 902 can be secured to a frame assembly 910 that also supports two axels 912, each having two wheels 914. The separator cart 900 can also have a self-dumping device 916, operated by a lever lift system, providing dumping action like a dump-truck (not shown).

Figure 10:
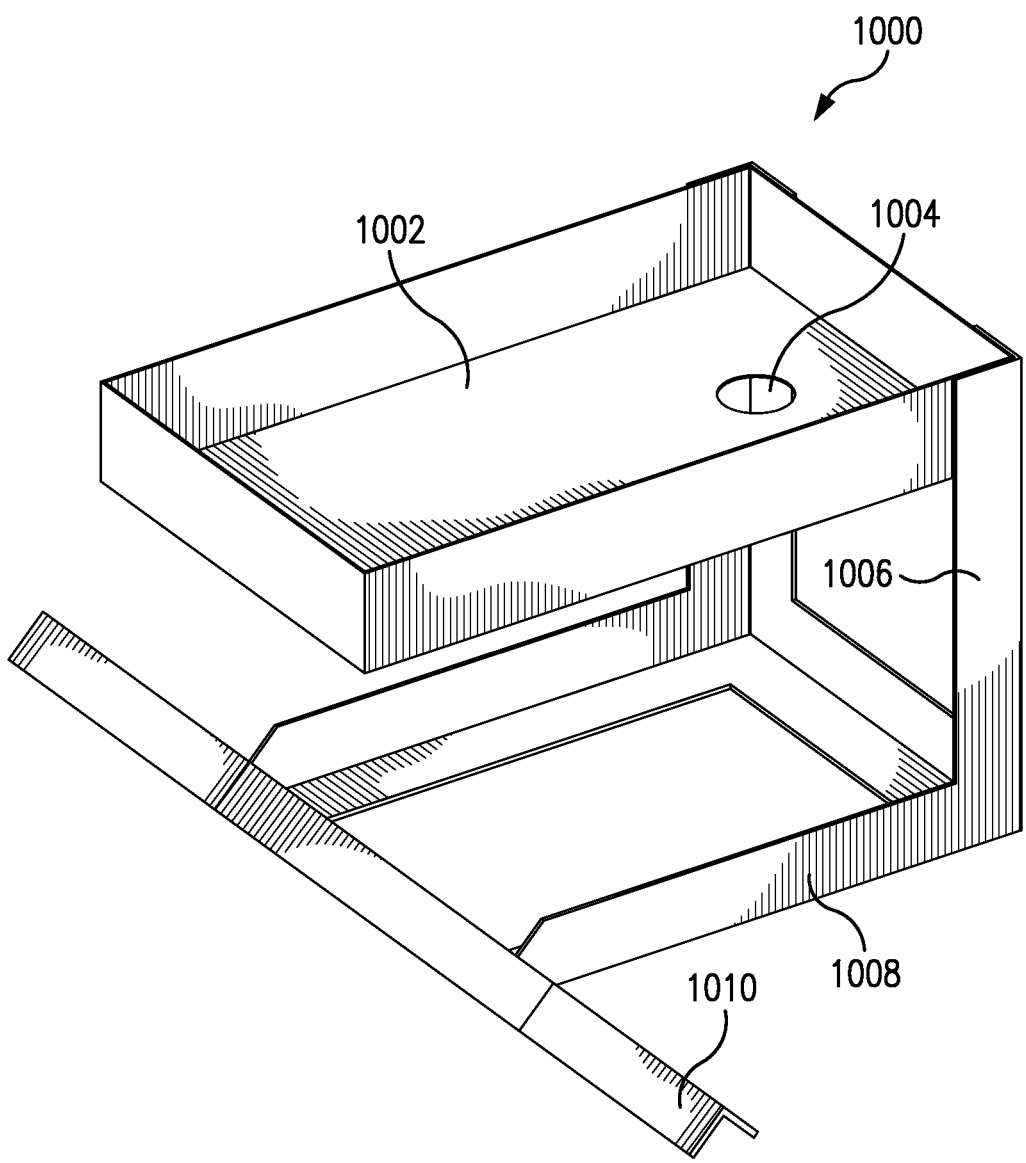
FIG. 10 is a perspective view of the separator cart parking and drainage assembly used in the system of FIG. 1.

As shown in FIG. 10, the system 100 may also have a separator cart parking and drainage assembly 1000. The separator cart parking and drainage assembly 1000 can have a drainage pan 1002, drain 1004, legs 1006, base 1008, and wheel wedge 1010. The separator cart parking and drainage assembly 1000 can be configured such that the cart bottom 906 and drainage hole 908 can be positioned over the drainage pan 1002, and the front wheels 914 of the cart 900 can be secured behind the wheel wedge 1010 such that the cart 900 can remain generally stationary when positioned underneath the first separator chute 216. The separator cart parking and drainage assembly 1000 may be secured to the system frame 102.

Figure 11A:
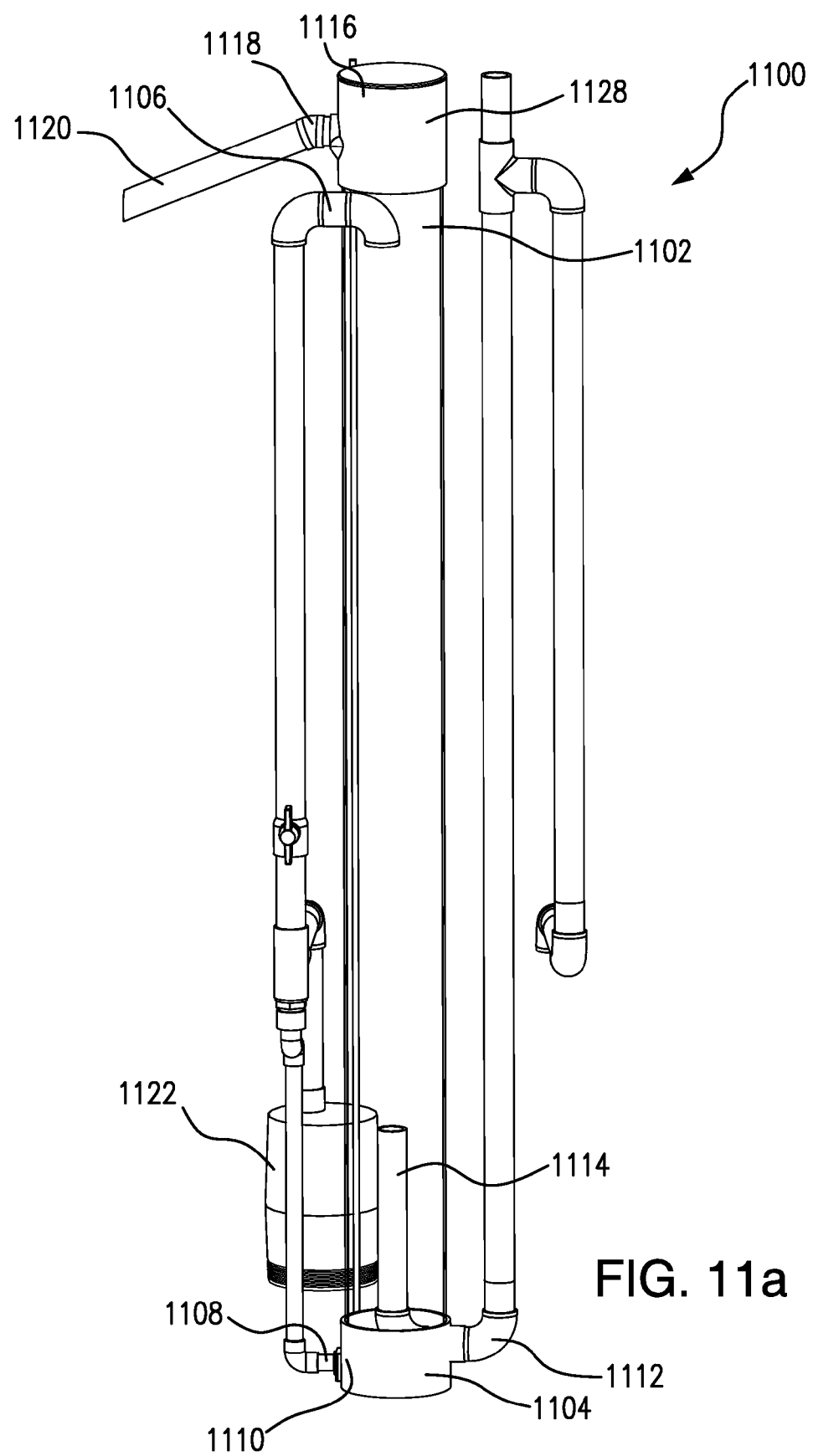
FIG. 11a is a perspective view of the organic separator used in the system of FIG. 1.

FIG. 11a illustrates an organic separator 1100. The organic separator may be comprised of a vertical tower 1102 and tower base 1104. The vertical tower 1102 can be configured to hold wash water. The vertical tower 1102 can have a wash water inlet 1106 near its top. The vertical tower 1102 can also have a second wash water inlet 1108 at its base 1104. The tower base 1104 may have a Venturi valve 1110 built into the base 1104. The vertical tower 1102 can also have a wash water outlet 1112 at its base 1104, with an outlet pipe assembly 1114 extending within the bottom vertical portion of the tower 1102. The organic separator 1100 can also have a foam collection cup 1116 located on the top of the vertical tower 1102. The foam collection cup 1116 may have an outlet 1118 and outlet pipe assembly 1120. The organic separator 1100 may also have a pump 1122. The organic separator 1100 can be positioned on the system 100 and the wash water inlet 1124 and outlet 1126 pipe assemblies attach into the storage tank 800 (as shown in FIG. 11b).

Figure 12:
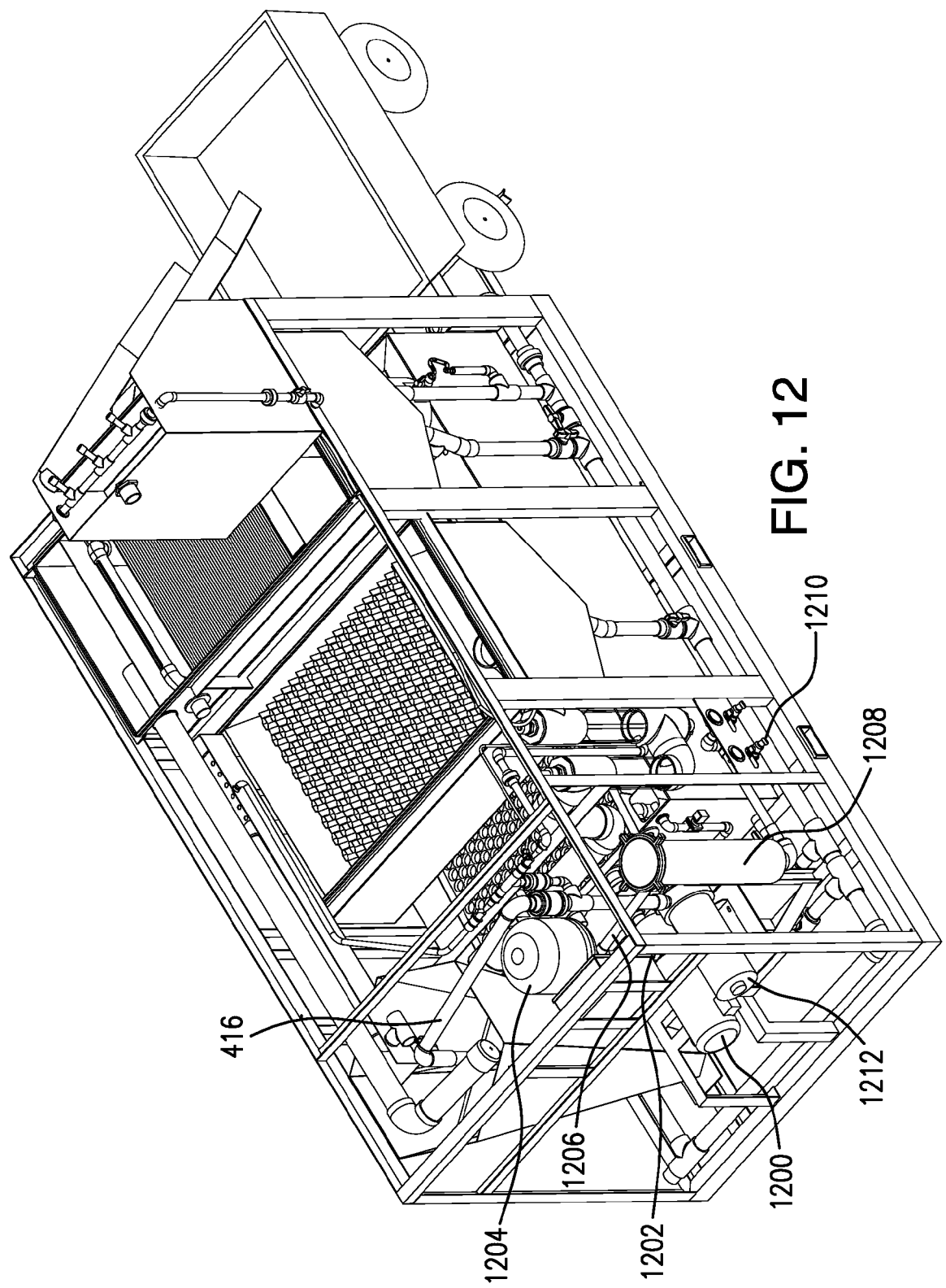
FIG. 12 is a perspective view of the supply and process pump assemblies as they reside in the overall system of FIG. 1.

As shown in FIG. 12, the system 100 may have a supply pump assembly 1200, that supplies wash water from the storage tank 800, through a pipe 1202 to an expansion bladder 1204, through a pipe 1206 to a 5-20 micron filter 1208, and to a plurality of hose bibs 1210. The system 100 may also have a process pump 1212 that aids the circulation of wash water within the system 100, for example, continuously pumping the wash water from the storage tank to the bioreactor 400 through the inlet pipe 416.

Operation of System

The wash water to be recycled is wash water that runs off of objects that are washed, such as golf carts, landscaping equipment and waste management equipment. These objects can have numerous solids attached to them, including grass, dirt, oil, and other solid materials. Therefore, as the wash water runs off, the wash water carries various solids with the wash water.

Figure 13:
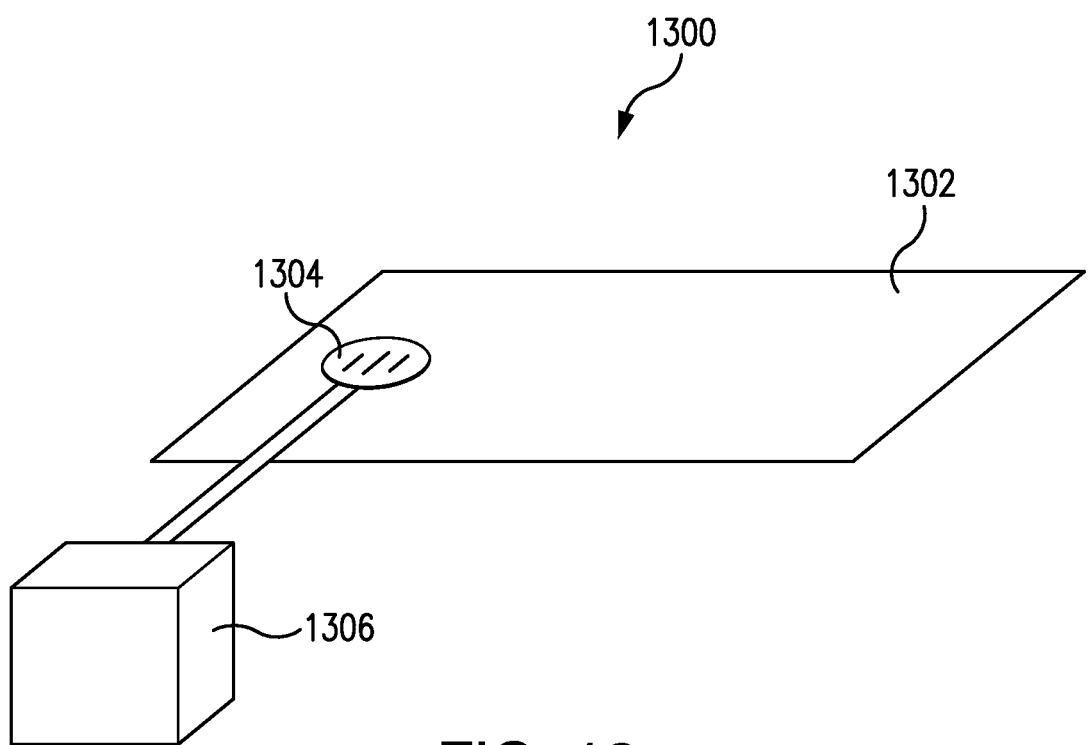
FIG. 13 is a perspective view of the wash pad assembly used in the system of FIG. 1.

Referring to FIG. 13, the objects to be washed are typically placed onto a wash pad system 1300. The wash pad system may have a substantially flat wash pad 1302 but configured to allow wash water to flow into a drain opening 1304 located on or near the wash pad 1302. The wash pad 1302 may be made of concrete, but it will be recognized that a wash pad may also be made of aluminum, stainless steel, plastic or other materials that are configured to support the object to be washed and drain wash water and solids that run off after an object is washed.

Wash water to be used for washing may be contained in and supplied by the system storage tank 800. A hose may be attached to a storage tank hose bib 1210 assembly that supplies pressurized water to wash a given object, preferably supplying a high pressure stream of water that is useful in washing the object. The storage tank 800 can receive fresh water through one of the storage tank inlets 810 to compensate for any wash water that may have been lost during the washing and wash water recycling process. The wash water, along with solids washed off of the object, may flow into a drain 1304 located on the wash pad assembly, and into a wash water reservoir 1306 where the wash water and accompanying solids are stored.

Wash water may be pumped to the first separator inlet 206 from the wash pad drainage reservoir 1306 through a hose or pipe attached to the first separator inlet (not shown). The wash water flowing into the first separator 200 from the inlet pipe can fill the first chamber 204 and cascade over the separator screen assembly 214 by gravity flow, with the screen 214 separating larger solids from the wash water. As the solids build up on the screen 214, gravity causes the solids to slide down the chute on the screen assembly 214 and into the separator cart 900. The second chamber 208 may collect the wash water after it passes through the screen 214. Periodically, the spray nozzle assembly 220 may be used to clean the screen 214 through a pressurized wash.

The wash water may exit the first separator 200 by gravity flow through the outlet at the bottom of the second chamber 210. The second separator 300 may be configured to further separate solids from the wash water, including hydrocarbons (e.g. oil) that may be contained in the wash water. The first chamber 304 of the second separator 300 may receive wash water through gravity flow from the first separator 200, through an outlet pipe (not shown). The wash water flowing into the first chamber 304 of the second separator 300 may be capable of moving from the first chamber 304 to the second chamber 306, by flowing over the first plate 310.

The coalescing grids 316 in the second chamber 306 may operate to control and minimize the flow and turbulence of the wash water as the wash water enters and is contained in the second chamber 306, and may cause the separation of oil from the wash water. This is based on the principle that hydrocarbons such as oil have a lower specific gravity than water and will naturally float on top of water if given time to separate without turbulence. This process would be greatly enhanced by the use of the inclined coalescing grids 316 which drastically reduce the flow rate of the wash water and allow the oil-water separation process to occur. This would be enhanced by the materials used for the coalescing grids 316, for example polypropylene, since oil droplets will attach to the charged surface, collect to form larger blobs, and release and float to the surface of the wash water.

The oil skimmer 320 can collect, through its opening 322, oil (oily water) that has floated to the surface of the wash water after having passed through the second chamber 306 and inclined coalescing grids 316. The second separator dam plate 324 may operate to prevent excess oil from floating past the skimmer 320 and into the third chamber 308, ensuring that the oil does not leave the second separator 300. The oil collected by the oil skimmer 320 may travel through the pipe and/or hose assembly 326 connected to the skimmer 320 and into the hydrocarbon accumulator 328 where the oil may be collected, stored, and ultimately removed from the system 100. The oil and water separate within the accumulator 328 (oil floating to the top) and the operator can determine when there is no longer wash water in the bottom of the accumulator 328 (i.e. the drain 334 no longer drains wash water or a pump connected to outlet 332 pumps oil and/or no longer pumps wash water).

In addition to the hydrocarbon separation aspects of the second separator 200, the second separator 200 may also collect solids from the wash water that fall to the bottom of the second separator by gravity. The solids at the bottom of the second separator 200 may exit the second separator through the first outlet 346 and second outlet (not shown) and the respective first and second outlet pipes (not shown). The solids (a sludge-like mass) may then be pumped to the wash pad assembly 1300.

In reference again to the second separator 200, wash water may move from the second chamber 306 to the third chamber 308, by flowing over the second flat plate 314 that separates the second chamber 306 from the third chamber 308. The wash water may flow out of the second separator 200 by gravity flow through the outlet pipe 342 and within and along the pipe 342 toward the distal end portion of the outlet pipe 344. As the wash water exits the outlet pipe through the plurality of holes 352, the wash water would become turbulent, and aerate, thereby adding to the overall oxygen content of the wash water as it falls into the bioreactor 400 by gravity flow. Adding, and maximizing, oxygen content into the wash water in the system would serve multiple purposes, including promoting growth of bacteria in the bioreactor 400 to aid the solids consumption process, and reduction of odors since hyper-oxygenated wash water prevents the growth of anaerobic bacteria, which create hydrogen sulfide (which typically smells like rotten eggs).

Naturally occurring bacteria 410 within the bioreactor chamber 406 attach to the media 408 within the bioreactor chamber 406. That is, it will be understood that within the bioreactor 400 naturally occurring bacteria 410 will cling to the surface of grains of sand in the bioreactor chamber 406 forming a bacterial film on grains of sand. The bioreactor 400 provides an ideal environment for the replication of naturally occurring bacteria 410 without the need to artificially inject commercial bacteria colonies into the bioreactor 400 or system 100. The naturally occurring bacteria 410 colony resident within the bioreactor chamber 406 consumes the biological solids that reside within the bioreactor chamber 406. It will be recognized that the higher the oxygen content in the wash water, and the higher the surface area for bacteria 410 to cling to, translates into a more ideal environment for a bacteria colony 401 to grow. It will also be recognized that as the bacteria die they provide additional food for new bacteria, further nurturing the growth of the overall bacteria colony 410 in the bioreactor 400.

In addition to the aerated wash water flowing by gravity into the bioreactor 400 from the second separator 300, hyper-oxygenated wash water may also be pumped into the bioreactor from the storage tank 800 to further enhance the bacteria replication and solids consumption process, as well as generate constant flow of the media bed 440 in the bioreactor chamber 406. That is, wash water may be pumped from the storage tank 800 through the inlet pipe assembly 416 by the process pump 1212. The end of the inlet pipe 416 may have an opening (not shown) where the hyper-oxygenated wash water from the storage tank 800 exits the pipe 416, with a flow of wash water directed downward toward the base of the bioreactor chamber 406. The pumped wash water may exit the end of the pipe 416 at a velocity and flows directly on top of the flow device 420 that may be fixed at the bottom of the bioreactor 400.

The flow device 420 and flanges 424 may redirect the wash water flow and cause full rotation of the wash water at the bottom of the bioreactor chamber 406 in a circular 360° motion. As the wash water rotates at the bottom of the bioreactor chamber 406, the sand grains 408 and solids lift off of the bottom of the chamber 406, and the entire media bed simultaneously rotates in a circular 360° motion around the axis of the pipe 416. As the circulation of the entire media bed continues, the sand grains 408 and solids rise within a distance off of the bottom of the chamber 406, cascade and rotate back down through the fluidized media bed 440 and rotate and rise up again in a churning and cyclical fashion, simultaneous to the circulation of the media bed. This process would result in the fluidized media bed 440, comprised of sand 408, bacteria 410 and other solids, that would be constantly moving and rotating within the chamber 406 around the pipe 416. This constant circulation and rising and falling motion provides excellent transfer capability between the wash water and bacterial film on the sand grains. This high surface area combined with excellent transfer capability further ads to an ideal habitat for bacterial growth. Moreover, as the sand grains 408 bump into each other during their rising and falling within the bioreactor 400, the grains 408 knock off debris and act as a self cleaning function which allows for new areas for bacterial growth on the sand grains 408.

In addition to receiving wash water from the second separator 200 and storage tank 800, the bioreactor may also receive solids collected from the bottom of the third separator 500 (including solids and dead bacteria). These solids may be pumped from the bottom of the third separator 500, through the third separator outlet 524 and pipe assemblies 526, and into the bioreactor 400 (shown in FIG. 6c). Therefore, the solids to be consumed in the bioreactor 400 may include the remaining solids resident in the wash water sent to the bioreactor 400 and the solids resident at the bottom of the third separator 500.

As the wash water level rises within the bioreactor 400, the high level portion of the wash water may overflow into the channel 434 and exit the bioreactor 400 through the channel 434 by gravity flow. The wash water that flows out of the bioreactor 400 and into the channel 434 would be substantially free of solids, but contain some bacteria (both dead and alive). The wash water can flow along the channel 434 by gravity flow toward an end portion of the channel 434. As the wash water falls through the plurality of holes 438 on the bottom end portion of the channel 436, the wash water can become turbulent, and aerated, thereby adding more oxygen to the wash water as it falls by gravity into the third separator 500.

The third separator 500 can be configured to separate additional solids from the wash water, particularly bacteria, further clarifying the wash water. The first chamber 504 can receive the wash water from the bioreactor 400 (via the channel 434). The wash water can flow from the first chamber 504 to the second chamber 506 by flowing underneath the first flat plate 510 that separates the main part of the first chamber 504 from the second chamber 506. The corrugated plates 522 in the second chamber 506 may be configured to reduce the flow and turbulence of the wash water and allow the solids, particularly bacteria, contained in the wash water to fall by gravity and settle at the bottom of the third separator 500. The solids that settle at the bottom of the third separator 500 (mainly dead bacteria) may periodically be removed through the outlet 524 located at the bottom of the second chamber 506. The outlet pipe 526 can connect to the outlet 524 and carry the solids back into the bioreactor 400. The dead bacteria would be additional food for the live bacteria colony 410 in the bioreactor 400.

The wash water from the second chamber 506, substantially free of solids, can then flow over the second flat plate 518 separating the second chamber 506 from the third chamber 508, and flows into the third chamber 508. The wash water can flow out of the third chamber 508 through the outlet 528 and pipe assembly 530 located on the side of the third chamber 508, and into the oxidation chamber 600, by gravity flow.

The oxidation chamber's vertical chamber 602 can receive and channel the flow of wash water from the third separator 500 by gravity flow. The ultra-violet lamp 604 can generate ultraviolet light energy that energizes the air 608 within the translucent tube 606 and the wash water contained within the vertical chamber 602. The ultra-violet energy can cause the oxygen molecules contained within the air 608 to form ozone ($O_3$) gas. The ozone gas generated by this process can exit the translucent tube 606, travel along the outlet hose 614, and be added to a supply of wash water being pumped into the bottom inlet 622 of the vertical chamber 602. Near the point where the ozone gas enters the supply of wash water, a Venturi valve 618 can add additional oxygen to the wash water. The presence of a combination of ozone and ultra-violet radiation in the wash water causes an advanced oxidation reaction to occur. For example, the presence of a combination of ozone and ultra-violet light in the wash water creates hydroxyl radicals, superoxide ions and hydroperoxides from the wash water, each of which adds more powerful oxidizers to the wash water [accurate?].

As the wash water flows from the top of the vertical chamber 602 down to the bottom of the vertical chamber 602, the ozone gas contained in the wash water that enters the bottom inlet 622 can travel up, in the form of gas bubbles, toward the top of the vertical chamber 602 creating a counter-current flow of ozone gas. This counter-current flow can slow the velocity of the flow of wash water coming from the third separator 500 and maximize the wash water's exposure to additional oxygen, further oxygenating the wash water and creating an advanced oxidation process. Again, as indicated above, the presence of a combination of ozone and ultra-violet light in the wash water creates additional powerful oxidizers to the wash water. This causes advanced oxidation reactions, sterilizes the wash water more effectively, and increases available oxygen for the bacteria colony 410. [accurate?]

Ozone gas can also exit the vertical chamber 602 by back flowing into and out of the outlet pipe 530 that is connected to the third chamber 508 of the third separator 500.

The ultraviolet lamp 604, in addition to creating ozone, can also sterilize the wash water through the provision of ultraviolet energy into the wash water that kills microorganisms.

In alternative embodiments there can be two or more vertical chambers 602 in series or parallel, performing substantially the same functions as described above, further oxygenating and sterilizing the wash water.

As the wash water exits the oxidation chamber 600 and passes through the plurality of holes 626 along the length of the pipe assembly's distal end 628, the wash water would become turbulent, and aerate, adding more oxygen to the wash water as it falls by gravity onto the aeration tray 700 and mat 712.

The wash water can flow down the aeration tray 700 and into the storage tank 800 by gravity. As the wash water flows down the aeration mat 712, it can become increasingly turbulent, further oxygenating the wash water, creating an effect similar to water traveling down and along a brook. The now hyper-oxygenated wash water, hyper-oxygenated through the numerous previously described processes, can flow off of the aeration tray 700 and enter the storage tank 800 where the wash water can be stored and, in some aspects, re-circulated to the bioreactor 400.

Additionally, water can be pumped from the storage tank 800 and into the organic separator 1100 to further remove organic solids from the wash water. The vertical tower 1102 can receive wash water through the first inlet 1106 near the top of the tower 1102, pumped from the storage tank 800. Wash water can also be pumped into the second inlet 1108 at the base of the organic separator 1104. The pumped wash water at the base of the organic separator 1104, in combination with the Venturi valve built into the base 1104, can create a swirling and foaming effect at the bottom of the vertical tower 1102, causing air bubbles to rise within the column of wash water in the vertical tower 1102. Organic solids in the wash water would attach to the air bubbles and rise to the top of the organic separator tower creating organic foam 1128. The organic foam 1128 may be collected in the foam collection cap 1116 and siphoned off through the outlet 1118 and outlet pipe 1120 and onto the separator cart 900. Wash water may be returned to the storage tank 800 through the outlet and pipe assembly 1112 1114 at the base of the separator tower 1104. This is yet another advanced separation element and technique utilized to further separate organic solids from wash water.

As previously indicated, the process pump 1212 can pump the hyper-oxygenated wash water from the storage tank 800 to the bioreactor 400. The hyper-oxygenated wash water would add to the bio-reaction process further providing the bacteria colony 410 with an ideal environment to grow and consume the solids contained in the bioreactor 400. The supply pump 1200 can supply wash water to the hose bibs 1210 for use during washing.

The process pump 1212 can be electrical and in operation 24 hours a day to support the bio-consumption process, but would not expend significant energy. The system may also be very quiet, similar to the noise generated by a refrigerator. Depending on the environmental circumstances, the system would retain about 90% of the wash water used each day, with the other 10% being lost due to various factors such as evaporation, spillage and drag-off (i.e. water carried off by the objects washed).

A timer connected to the storage tank 800 can cause a switch to be periodically turned on and fresh water is pumped into the storage tank 800 to replenish lost wash water to a desirable level in the storage tank 800, causing a valve to shut off when a certain water level is reached (switches and valves not shown).

Figure 14:
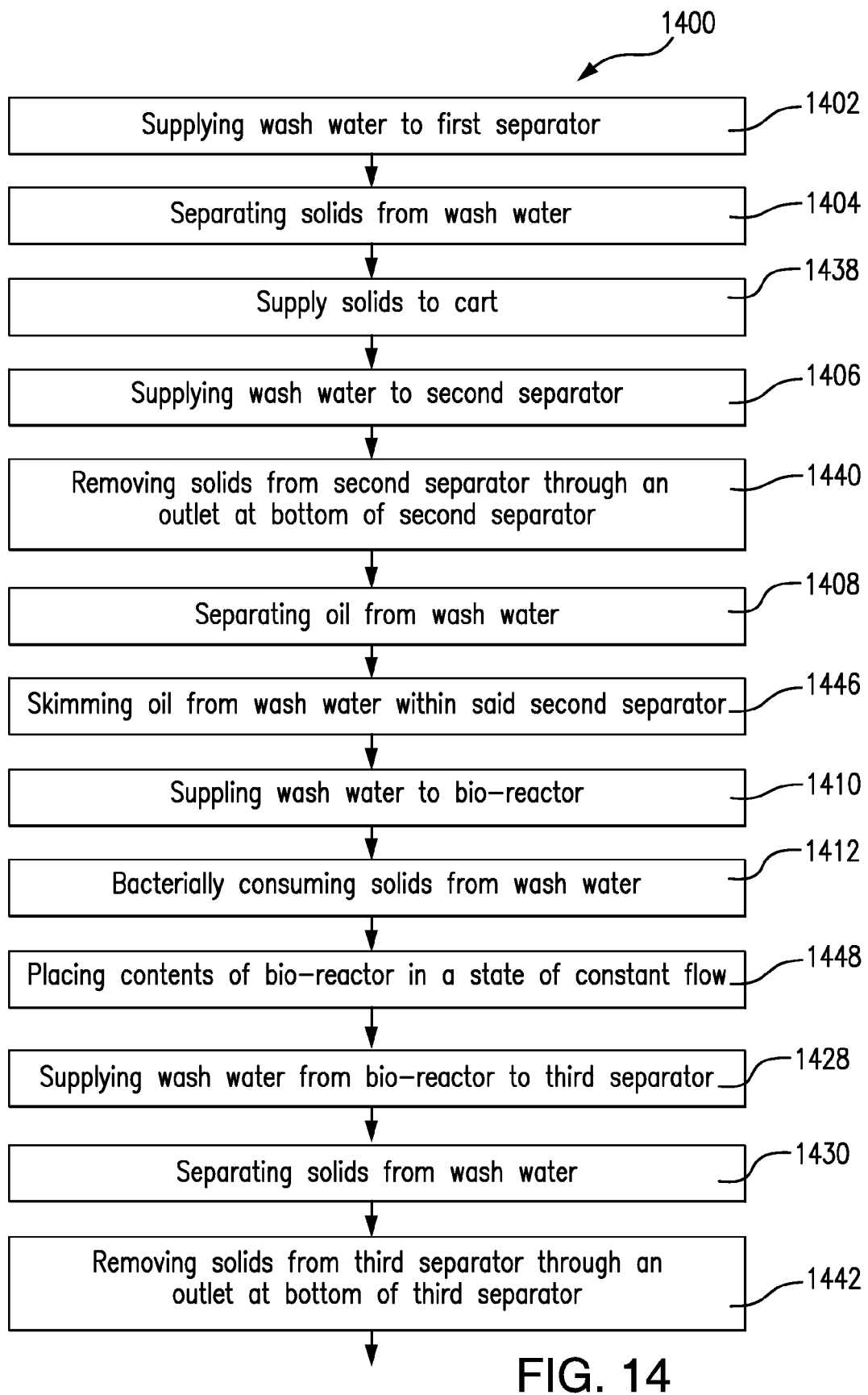
FIG. 14 is a flow chart illustrating a process for wash water recycling in accordance with an embodiment of the present invention.
Figure 14:
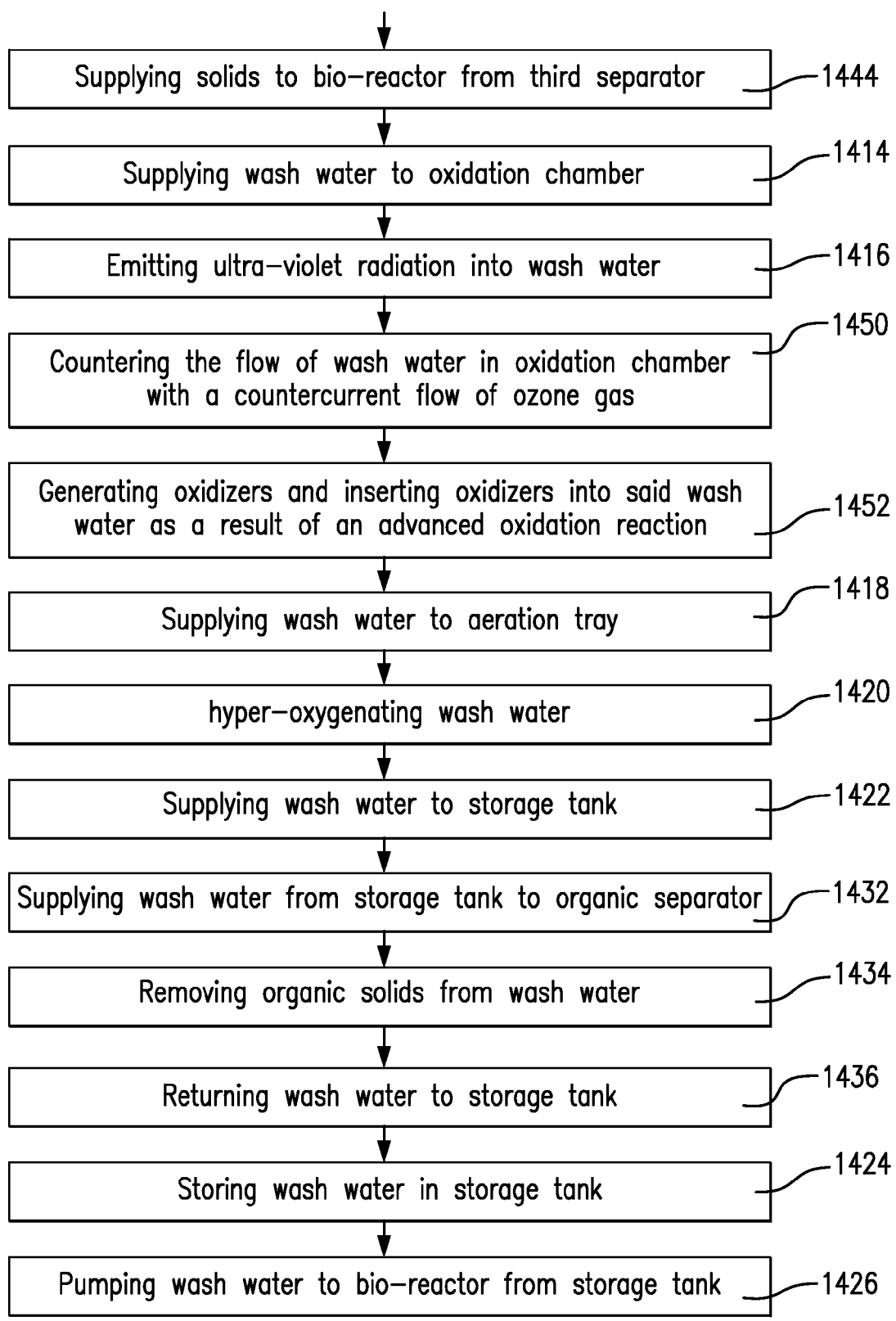

Referring now to FIG. 14, and by way of general overall summary (and by no means limiting the numerous additional steps in the process described herein), in the process 1400, wash water is supplied to the first separator 1402, the first separator separates solids from the wash water 1404, wash water is supplied to the second separator 1406, the second separator separates oil from the wash water 1408, wash water is supplied to the bioreactor 1410, bacteria in the bioreactor consume solids in the bioreactor 1412, wash water is supplied to the oxidation chamber 1414, ultraviolet energy is emitted into the wash water 1416, wash water is supplied to the aeration tray 1418, wash water is hyper-oxygenated 1420, wash water is supplied to the storage tank 1422, wash water is stored in the storage tank 1424, and wash water is pumped back into the bioreactor from the storage tank 1426.

Referring further to FIG. 14, in another aspect, wash water is supplied from the bioreactor to the third separator 1428, solids are separated from the wash water 1430, and wash water is supplied to the oxidation chamber 1414.

Referring further to FIG. 14, in another aspect, wash water is supplied from the storage tank to an organic separator 1432, organic solids are removed from the wash water 1434, and wash water is returned to the storage tank 1436.

Referring further to FIG. 14, in another aspect, solids are supplied to the cart 1438.

In another aspect, wash water is supplied to the second separator by gravity flow. In another aspect, solids are removed from the second separator through an outlet at the bottom of the second separator 1440.

Referring further to FIG. 14, in another aspect, wash water is supplied to the bioreactor, third separator, oxidation chamber, and aeration tray by gravity flow.

Referring further to FIG. 14, in another aspect, solids are removed from the third separator through an outlet at a bottom of the third separator 1442 and supplied to the bioreactor 1444.

Referring further to FIG. 14, in another aspect, oil is skimmed from the wash water within the second separator 1446.

Referring further to FIG. 14, in another aspect, the contents within the bioreactor are placed in a state of constant flow 1448.

Referring further to FIG. 14, in another aspect, the flow of the wash water in the oxidation chamber is countered with a countercurrent of ozone gas 1450.

Referring further to FIG. 14, in another aspect, oxidizers are inserted into the wash water as a result of an advanced oxidation reaction caused by the presence of the combination of ozone and ultra-violet radiation in the wash water 1452.

Figure 15:
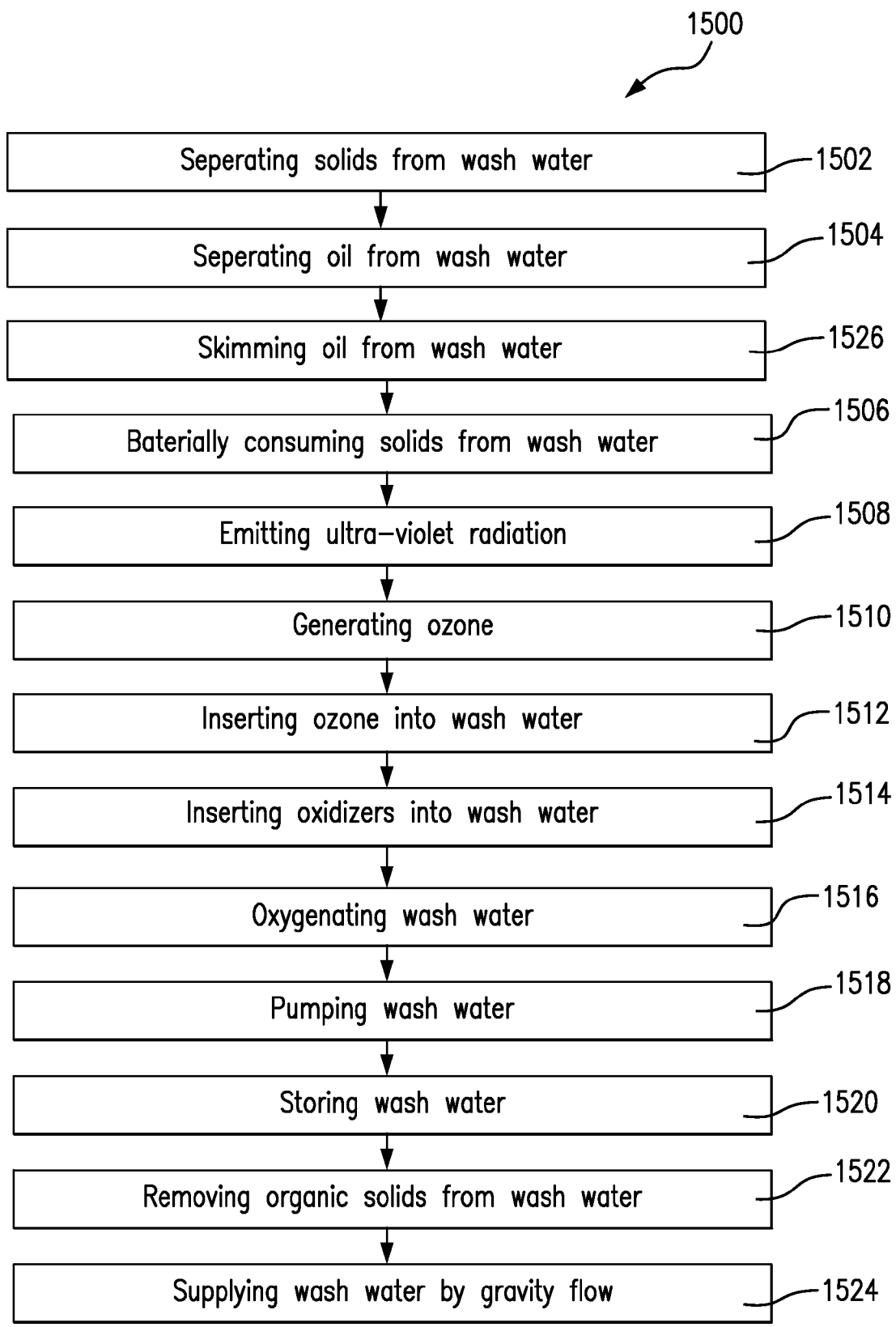
FIG. 15 is a flow chart illustrating a method for wash water recycling in accordance with an embodiment of the present invention.

Referring now to FIG. 15, and by way of general overall summary (and by no means limiting the numerous additional steps in the process described herein), in the method 1500, solids are separated from the wash water 1502, oil is separated from the wash water 1504, solids from the wash water are consumed by bacteria 1506, ultra-violet radiation is emitted into the wash water 1508, ozone is generated by the ultra-violet radiation 1510, ozone is inserted into the wash water 1512, oxidizers are inserted into the wash water as a result of an advanced oxidation reaction caused by the presence of the combination of ozone and ultra-violet radiation in the wash water 1514, the wash water is oxygenated 1516, the wash water is pumped into the bioreactor 1518, the wash water is stored in the storage tank 1520, organic solids are removed from the wash water 1522, the wash water is supplied by gravity flow 1524 to the various system components, and oil is skimmed from the wash water 1526.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods and processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

What is claimed is:

1. A system for recycling of wash water, said system comprising:
    a first separator configured to receive wash water and separate solids from said wash water;
    a second separator configured to receive wash water from said first separator and separate oil from said wash water;
    a bioreactor configured to receive said wash water from said second separator, wherein said bioreactor comprises bacteria to consume solids from said wash water;
    an oxidation chamber configured to receive said wash water from said bioreactor, wherein said oxidation chamber comprises an ultra-violet lamp configured to generate ozone for insertion into said wash water;
    an aeration tray configured to receive said wash water from said oxidation chamber and further oxygenate said wash water;
    a storage tank configured to receive said wash water from said aeration tray and store said wash water; and
    a pump configured to pump said wash water from said storage tank to said bioreactor.

2. The system of claim 1, further comprising a third separator configured to receive said wash water from said bioreactor and separate solids from said wash water.

3. The system of claim 2, wherein said third separator comprises a bottom where said solids settle, said bottom further comprising an outlet where said solids can be removed from said third separator and provided to said bioreactor.

4. The system of claim 1, further comprising an organic separator configured to receive said wash water from said storage tank and remove organic solids from said wash water and return said wash water to said storage tank.

5. The system of claim 1, further comprising a cart configured to receive solids from said wash water.

6. The system of claim 1, wherein said first separator comprises a filtering element configured to separate solids from said wash water.

7. The system of claim 1, wherein said first separator is configured to supply said wash water to said second separator by gravity flow.

8. The system of claim 1, wherein said second separator is configured to supply said wash water to said bioreactor by gravity flow.

9. The system of claim 2, wherein said bioreactor is configured to supply said wash water to said third separator by gravity flow.

10. The system of claim 1, wherein said bioreactor is configured to supply said wash water to said oxidation chamber by gravity flow.

11. The system of claim 1, wherein said oxidation chamber is configured to supply said wash water to said aeration tray by gravity flow.

12. The system of claim 2, wherein said third separator is configured to supply wash water to said oxidation chamber by gravity flow.

13. The system of claim 1, wherein said second separator comprises an oil skimmer configured to separate oil from said wash water within said second separator.

14. The system of claim 1, wherein said second separator comprises a bottom where said solids settle, said bottom further comprising an outlet where said solids can be removed from said second separator.

15. The system of claim 1, wherein said system is self-contained.

16. The system of claim 1, wherein said system is portable.

17. The system of claim 1, wherein said bioreactor comprises a flow element configured to create a constant flow of the contents within said bioreactor.

18. The system of claim 1, wherein said oxidation chamber comprises ozone gas generated by said ultra-violet lamp.

19. The system of claim 1, wherein said oxidation chamber comprises a translucent tube.

20. The system of claim 1, wherein said wash water in said oxidation chamber comes into contact with ozone, ultra-violet radiation and additional oxidizers.

* * * * *